ELECTRONIC CONTROL CIRCUIT FOR DIRECT DRIVE AUTOMATIC

Filed Sept. 13, 1965 13 Sheets-Sheet 1

INVENTORS
Burke J. Crane
Douglas J. Walker
George H. Myers
BY Hill, Sherman, Meroni, Gross & Simpson
ATTORNEYS INVENTORS
Burke J. Crane
Douglas J. Walker
George H. Myers
BY
ATTORNEYS INVENTORS
Burke J. Crane
Douglas J. Walker
George H. Myers
BY Hill, Sherman, Meroni, Gross & Simpson
ATTORNEYS

INVENTOR.

Burke J. Crane

Douglas J. Walker

George H. Myers

BY Hill, Sherman, Meroni, Gross & Simpson

ATTORNEYS

INVENTORS
Burke J. Crane
Douglas J. Walker
George H. Myers
BY Hill, Sherman, Meroni, Gross & Simpson
ATTORNEYS INVENTORS
Burke J. Crane
Douglas J. Walker
George H. Myers
BY Hill, Sherman, Meroni, Gross & Simpson
ATTORNEYS INVENTORS
Burke J. Crane
Douglas J. Walker
George H. Myers
BY Hill, Sherman, Meroni, Gross & Simpson
ATTORNEYS INVENTORS
Burke J. Crane
Douglas J. Walker
George H. Myers
BY Hill, Sherman, Meroni, Gross & Simpson
ATTORNEYS INVENTORS
Burke J. Crane
Douglas J. Walker
George H. Myers
BY Hill, Sherman, Meroni, Gross & Simpson
ATTORNEYS

ELECTRONIC CONTROL CIRCUIT FOR DIRECT DRIVE AUTOMATIC

Filed Sept. 13, 1965

INVENTORS
Burke J. Crane
Douglas J. Walker
George H. Myers
BY Hill, Sherman, Meroni, Gross & Simpson
ATTORNEYS Feb. 20, 1968 B. J. CRANE ET AL 3,369,381

ELECTRONIC CONTROL CIRCUIT FOR DIRECT DRIVE AUTOMATIC

Filed Sept. 13, 1965 13 Sheets-Sheet 11

INVENTORS
Burke J. Crane
Douglas J. Walker
George H. Myers

BY Hill, Sherman, Meroni, Gross & Simpson
ATTORNEYS

INVENTORS
Burke J. Crane
Douglas J. Walker
George H. Myers
BY Hill, Sherman, Meroni, Gross & Simpson
ATTORNEYS INVENTORS
Burke J. Crane
Douglas J. Walker
George H. Myers
BY Hill, Sherman, Meroni, Gross & Simpson
ATTORNEYS 3,369,381

ELECTRONIC CONTROL CIRCUIT FOR DIRECT DRIVE AUTOMATIC

Burke J. Crane, Riverside, Ill., and Douglas J. Walker and George H. Myers, St. Joseph, Mich., assignors to Whirlpool Corporation, Benton Harbor, Mich., a Delaware corporation Filed Sept. 13, 1965, Ser. No. 487,019
35 Claims. (Cl. 68—12)

ABSTRACT OF THE DISCLOSURE

A control circuit for a laundry machine motor which generally includes a power circuit coupled with a reversing circuit. A firing angle control circuit regulates the amount of power supplied to the motor from the power circuit and the reversing circuit controls the power circuit to establish the desired direction of rotation of the motor. In particular, the reversing circuit is operative to cyclically reverse the motor or to drive the motor in a single direction.

DISCLOSURE

This invention relates to a laundry machine wherein an oscillatable wash means is driven by a reversible motor energized by control circuit means characterized by a power circuit coupled with a reversing circuit for reversing the motor cyclically or for operating the motor unidirectionally and regulated by a firing angle control circuit.

In the past there have been two general types of automatic laundry machines. These have been the vertical axis type and the horizontal axis type. The vertical axis type has been most widely used in home laundering machines marketed in the United States of America and various other countries where an adequate supply of hot water has been available for laundering operations. The horizontal type machine has been used in European countries where laundering practices have required the use of much higher water temperatures for laundering operations and where there has been a definite historical preference for machines of the horizontal type in both home and commercial laundry operations. Horizontal axis type machines have also been widely used in the United States for large commercial washers and extractors where engineering factors and traditional commercial preferences have been somewhat responsible for the selection of this type machine for large scale commercial use.

In both types of machines there is some form of oscillatable wash means for agitating materials to be laundered in the presence of a washing agent, either an agitator or a drum.

In vertical axis washing machines the basket or container for receiving the fabrics to be washed and centrifuged is mounted for rotation on a vertical axis while the washing operation in such a machine is usually carried out by oscillatory, reciprocatory or other types of agitating movements of a separate agitator member positioned within the basket or container and on its vertical axis whereas the centrifuging operation is completed by high speed rotation of the basket or container about that vertical axis to centrifuge most of the water used in the washing operation from the fabrics prior to a subsequent drying operation.

The horizontal axis type machine ordinarily requires no separate agitator for carrying out a washing operation. In this type machine the clothes receiving container drum or tumbler which serves as both the means for agitating the clothes and for extracting wash fluid therefrom is mounted for rotation on a horizontal axis even though it is common for machines of this general type to have drums mounted on axes as much as 45° from the horizontal. In this type machine the washing operation is normally carried out by rotating the drum or tumbler at speeds below those speeds at which the fabrics being cleaned would be pressed by centrifugal forces in fixed positions against the inner periphery of the drum or tumbler during its rotation and yet at speeds high enough to prevent balling of the fabrics within the drum or tumbler during its tumbling operations which may be unidirectional or bidirectional depending upon the nature of the cycle selected. The centrifuging operation in a horizontal type washing machine or extractor is somewhat similar to that of the vertical axis machine in that extraction of the laundry fluids following the rinsing phase of the washing step is carried out by high speed rotation of the clothes receiving drum or tumbler.

While separate motors have been used for carrying out the washing and extracting operations of both vertical axis and horizontal axis machines, factors such as space, weight, simplicity, serviceability, coordinated performance, and product cost have normally been responsible for the use of a single drive motor in both types of machines. Since both types of machines have required varied rotational speeds and movements of the drive members for carrying out the washing and extraction operations, a single drive motor has usually been used in conjunction with various types of motion converting mechanisms for changing rotary motion into oscillatory, reciprocatory, nutational or other types of motion as well as with multiple drive path transmissions, clutches, brakes and complex coordination controllers. Multiple speed motors have also been used.

In addition, even in those instances in which a driven member of a washing machine such as an agitator or drum is moved through a cyclic movement such as an oscillatory or alternating rotary motion during a washing operation, it has not been commercially feasible, or even possible in some cases, to vary the frequency or amplitude of the cyclic stroke or to vary the character or pattern of this movement of the driven member from a fixed preset character of movement as determined by the design characteristics of the primarily mechanical drive systems.

In accordance with the present invention, the oscillatable wash means is driven by a reversible motor and is either cyclically oscillated or unidirectionally rotated. The energization of the motor is effected through a power circuit coupled electrically with a reversing circuit. Voltage at a constant level is supplied to the motor with the assistance of a firing angle control circuit. Sequential control means including a switching means for conditioning the electronic drive control in accordance with a preset program permits either cyclic operation or continuous rotation.

It is therefore an object of this invention to provide a washing machine electronic drive control capable of simplifying or possibly eliminating the need for motion converting mechanisms, multiple drive path transmissions or variable speed transmissions normally used in washing operations and to provide a versatile control for rotational movements of vertical axis or horizontal axis laundry machines during their varied rotational or centrifugal extraction operations.

It is a further object of this invention to provide a substantially direct drive, which may or may not incorporate a speed reduction unit, depending upon the torque and speed characteristics of the motor used, from the driving motor to the driven members of a washing machine in which electronic means are employed to change the speed and directional characteristics of the driven members by controlling the electrical input to the drive motor.

Another object of this invention is to provide a novel laundry machine driven system in which the laundry machine's driving motors is directly connected, or substantially directly connected through a speed reduction unit, to its driven members and is controlled by an electronic circuit incorporating solid state components interposed in the energization circuit of the motor.

Another object of the present invention is to provide a novel electronic circuit for use in the energization circuit of an electric motor which alters the wave form and timing of the electrical energy input supplied to the motor.

Another object of this invention is to provide a novel energization and control circuit for a drive motor for cyclically reversing the motor.

A further object of the present invention is to provide a novel energization and control circuit for cyclically reversing the motor with deenergization of the motor occurring for a short predetermined period of time just prior to each reversal of the motor.

Another object of this invention is to provide a novel control circuit for an electric motor with means for maintaining the motor at a desired preselected constant motor speed under varying loads.

Another object of the present invention is to provide an electronic motor control circuit for selectively modifying or controlling the stroke rate or frequency of an oscillatable agitator or of another similar driven member movable through a series of alternating rotary movements.

Another object of this invention is to provide an electronic motor control circuit for a laundry machine wherein the arc length or amplitude of the agitator stroke or arcuate drum movement may be selectively modified or controlled as desired.

Another object of the present invention is to provide a motor control circuit for a laundry machine having an agitator or drum wherein means are provided for delaying the initiation of the agitator or drum movements between such successive movements in order to reduce the intermittent inertial loading of the motor driving the agitator or drum of the laundry machine.

A further object of this invention is to eliminate the necessity of using conventional types of motion converting mechanisms in vertical axis washing machines or the use of complex, multiple-path or variable speed transmissions for changing the speed ratios between the motor shaft and the driven members in the operation of horizontal axis laundry machines.

While it may find some applications in other fields, this invention is primarily directed to an electronic drive system for a laundry machine having an oscillatory, rotary, alternating rotary or other similar type of agitation mechanism for carrying out a washing operation and also including a centrifuging mechanism for performing a subsequent liquid extraction or fluid separation mechanism and wherein such agitation and centrifuging mechanisms are driven by a multiple field or multiple armature motor electrically connected to and controlled by an electronic control circuit capable of precisely controlling and varying the movements of the drive motor and the ultimately driven agitation and centrifuging mechanisms in accordance with a preselected cycle of operation.

These and other objects, features and advantages of the present invention will be more fully realized and understood from the following detailed description when taken in conjunction with the accompanying drawings wherein like reference numerals are intended to designate the same or similar structures and wherein.

As shown in the drawings.

Figure 1:
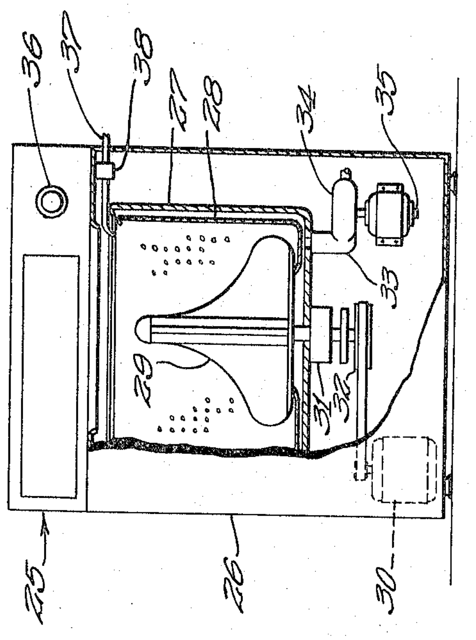
FIGURE 1 is a schematic front view of a laundry machine incorporating our invention and partially broken away to illustrate interior components thereof.

In FIGURE 1 of the drawings, there is diagrammatically illustrated a vertical axis washing machine 25 which includes a cabinet 26, a stationary tub 27, rotatable clothes basket 28 (centrifuging mechanism) and an agitator 29 (agitation mechanism). An electric drive motor 30 is selectively connected through a suitable clutch mechanism 31 to the basket 28 and the agitator 29. Interposed between the motor 30 and the clutch mechanism 31 is a fixed gear reduction box or belt reduction unit 32 which may be used in the event the speed or torque characteristics of the motor require it. It is to be understood that there is thus a direct drive from the motor 30 to either the basket 28 or the agitator 29 depending upon the position of clutch mechanism 31 to be described in greater detail hereinafter.

The washing machine 25 also includes a drain 33 connected to the tub 27 and a drain pump 34 operated by an associated pump drive motor 35. Automatic cycling mechanism, including timer motor 56, for sequentially performing the desired operations of the washer is initially actuated by a timer control knob 36. Washing fluid is supplied to the washing machine 25 through a supply pipe 37 which is controlled by a suitable solenoid operated shut-off valve 38.

Figures 9, 10, 13:
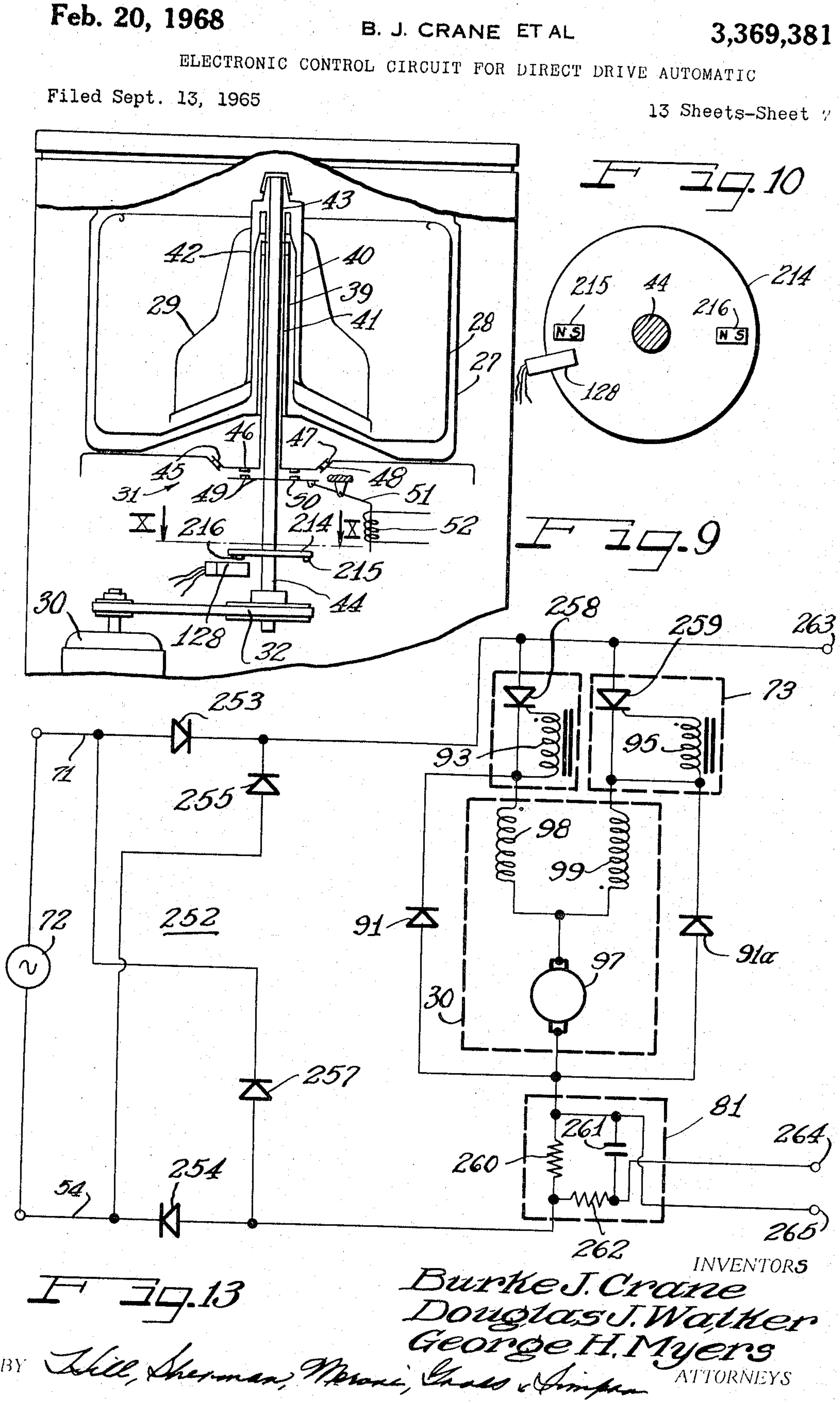
FIGURE 9 is a side view of an agitator showing a clutch mechanism and switching elements in combination with a laundry machine incorporating our invention.
FIGURE 10 is a sectional view taken along line X—X of FIGURE 9.
FIGURE 13 is a schematic diagram of a power circuit which may be employed in conjunction with the power control circuits illustrated in FIGURE 12.

The specific clutch mechanism 31 and the mechanical support and arrangement of the basket 28 and the agitator form no part of the present invention, but may, by way of example, be of the type which is illustrated and described in the pending application of Glen A. Severance, Clifton A. Coff and William F. Robandt, Ser. No. 381,621, now Patent No. 3,279,223, and assigned to the same assignee as the present invention. A suitable clutch mechanism is diagrammatically illustrated, however, in FIGURE 9 of the drawings. As shown in FIGURE 9, the tub 27 is provided with a hollow center post 39 which rises to a point above the normal liquid level of the tub. The basket 28 is provided with a central upstanding portion 40 which is nested over the center post 39 and is integrally connected to a hollow drive shaft 41 which is disposed within the center post 39. The agitator 29 is disposed within the basket and includes a post portion 42 which is nested over the upstanding portion 40 of the basket 28. The agitator is carried at the upper end of an agitator drive shaft 43 which is integrally connected to and forms a continuation of the drive shaft 44 coming from the gear reduction 32 of the motor 30. It will be understood that the agitator 29 at all times has the same motion as the drive shaft 44.

The hollow basket drive shaft 41 is arranged to have limited vertical movement in addition to its rotational movement. Its lower end is provided with a clutch plate 45 having suitable clutch pads 46 on its lower surface. The peripheral edge of the clutch plate 45 is frusto conical and provided with a brake surface 47 which engages a cooperating complementary surface 48 on the stationary frame of the washer 25. A second clutch plate 49 is slidably mounted on the agitator drive shaft 43 and splined thereto so that it is driven at all times by the agitator drive shaft 43 but may be moved vertically with respect thereto. The upper surface of this second clutch plate 49 is provided with suitable clutch pads 50 which mate with the clutch pads 46 of the upper plate 45 when clutch plate 49 is in its upper position. The lower clutch plate 49 is arranged to be raised by any suitable mechanism 51 upon energization of an electric solenoid 52.

From the diagrammatic illustration in FIGURE 9, it will be seen that when the solenoid 52 is energized, the lower clutch plate 49 is raised to cause the clutch pads 46 and 50 to mate and additionally the hollow basket drive shaft 41 is raised sufficiently so as to lift the peripheral edge 47 out of braking engagement with the stationary brake surface 48. The basket 28 under these circumstances is directly driven by the motor 30 as is also the agitator 29. There is no relative rotational motion between the basket 28 and the agitator 29. When the solenoid 52 is deenergized, the lower clutch plate 49 drops down to disengage the mating clutch pads 46 and 50 and to cause the peripheral portion 47 of the clutch plate 45 to engage the braking surface 48 of the stationary frame. Under these circumstances, the agitator 29 will be directly driven by the motor 30 but the basket 28 will be stationary. Thus, if the motor is periodically reversed, the agitator is periodically reversed.

Figure 2:
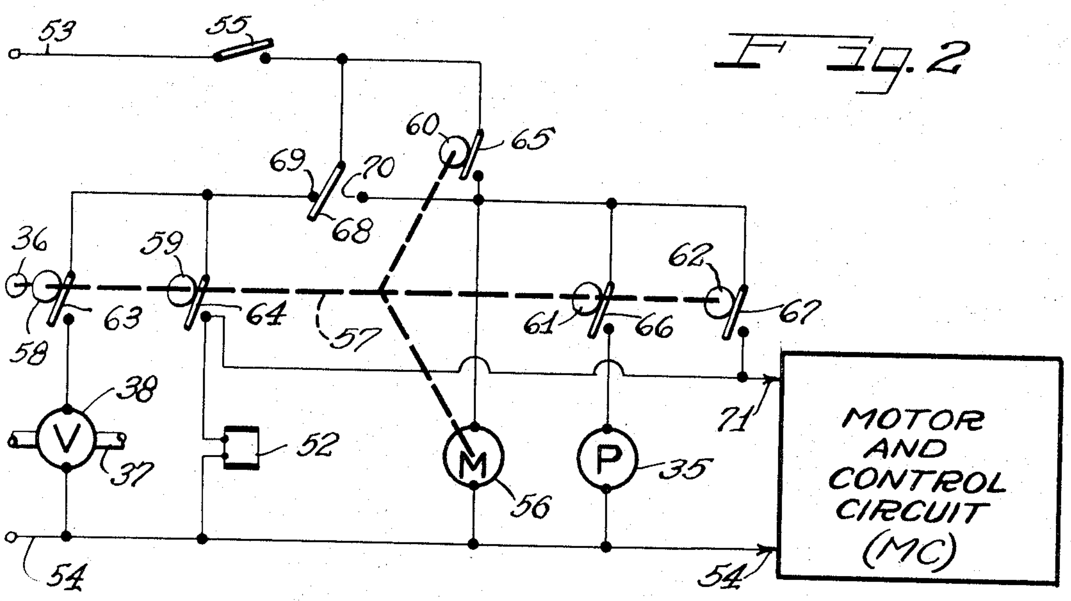
FIGURE 2 is a schematic diagram of an illustrative timer control circuit for the laundry machine shown in FIGURE 1.

A timer control circuit for the washing machine 25 above described is illustrated schematically in FIGURE 2 of the drawings. The main washing machine motor 30 and its associated control circuit, represented by the block MC, are arranged to be energized through power supply conductors 53 and 54 from a conventional 115 volt sixty cycle alternating current source. A master switch 55 under the control of axially movable knob 36 is preferably interposed in the electric supply line. The cycling operation is under the control of a timer motor 56 which drives a cam shaft 57 having a plurality of cams 58, 59, 60, 61 and 62 thereon. These cams 58 to 62 are arranged to close associated switches 63 to 67, respectively, for predetermined periods at predetermined times during the cycle of operation, these periods and times being shown by the chart shown by FIGURE 3. The actual timing of the cycle does not start until the tub 27 has been filled with water to its desired washing level. The water level is controlled by a float switch arm 68 which engages a contact 69 in its low water level position and engages a contact 70 when the water level within the tub 27 has reached its desired height for washing.

As is common practice, the main timer control knob 36 has limited axial movement as well as rotational movement. Depression of the knob 36 in an axial direction closes the master switch 55 while rotational movement sets the desired length of the washing period. The shut-off valve 38 in the water fill line 37 is energized through cam switch 63 and float switch 68. Thus when the control knob 36 is moved to start a cycle of operation, master switch 55 is closed and cam 58 is advanced to close switch 63. Shut-off valve 38 is now energized and, hence, opened and water begins to flow through supply pipe 37. Water continues to flow into tub 27 through conduit 37 until float switch arm 68 moves from contact 69 to contact 70. At a period of time longer than that necessary to fill the tube 27 cam 58 causes switch 63 to open. Movement of switch arm 68 to contact 70 actually starts the timing cycle since timer motor 56 is arranged to be energized through switch arm 68 and contact 70. Since the timer motor 56 must continue to operate except during periods when the tub 27 is being filled with water, timer motor 56 must have an additional energization circuit. This is accomplished by switch 65 under control of cam 60 which provides a circuit in parallel with float switch 68 in accordance with the profile of cam 60.

At the time the float switch arm 68 energizes the timer motor 56, cam switch 67 is closed to energize the main motor 30 and its associated control circuit MC.

The movable clutch plate 49 (FIGURE 9) which connects the clothes basket 28 to the drive shaft 44 is controlled by solenoid 52. This solenoid 52 is arranged to be energized through cam switch 64. The pump 35 which causes withdrawal of water from tub 27 is energized through cam switch 66.

Figure 3:
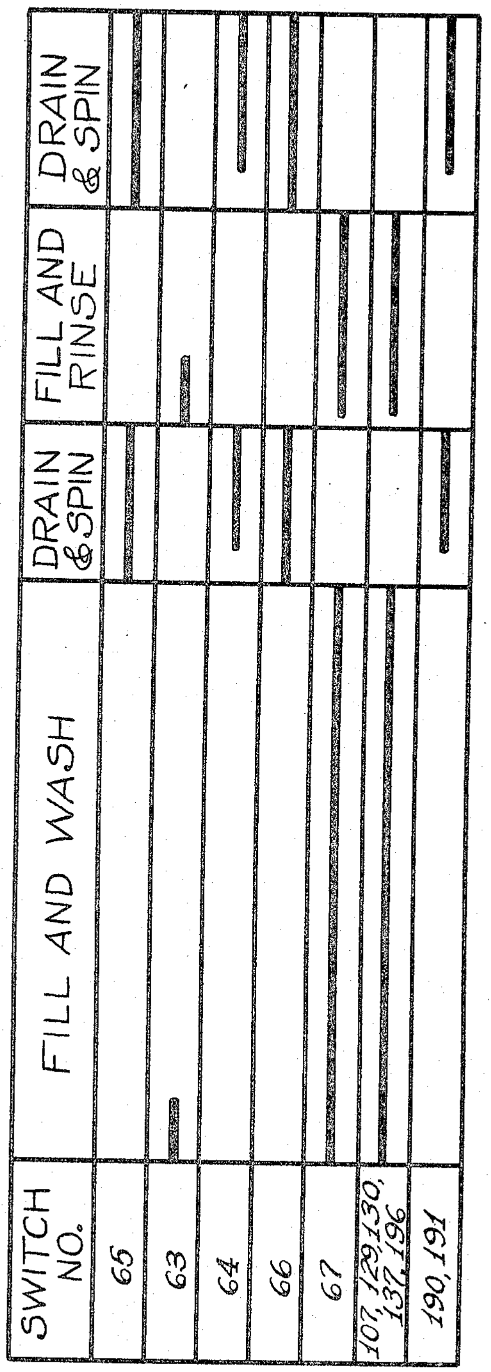
FIGURE 3 is a chart illustrating graphically the various machine cycle timer switch positions for the circuit shown in FIGURE 2.

From a consideration of the simplified and illustrative chart in FIGURE 3, it will be seen that after the main motor 30 is started through switch 67, the agitator 29 will be driven by the main motor 30 for a predetermined period of time. It will then be deenergized and cam switch 66 will energize pump 35 to withdraw water from tub 27. Cam switch 64 will then be closed so that when the water has reached its low level position, switch arm 68 will be moved back against contact 69 and clutch solenoid 52 will be energized to connect basket 28 to drive shaft 44. Simultaneously the main motor 30 and its control circuit MC will be energized through connectors 54 and 71, and the basket 28 and agitator 29 will be rotated together by the main motor 30 during a centrifugal extraction or spin period. At the end of the centrifugal extraction or spin period switch 65 opens to deenergize the timer motor 56 after cam switch 63 has closed to reopen fill valve 38. This causes refilling of the tub 27 with water for the rinse cycle. When the tub has been filled, switch arm 68 again closes against contact 70 to energize the timer motor 56. The timer then advances the cam shaft 57 to close main motor cam switch 67 and an operation similar to the previous wash and spin cycle then follows with the exception that the rinse cycle is shorter than the wash cycle. At the end of the final spin cycle the timer motor 56 leaves all of its associated cam switches 63, 64, 65, 66 and 67 in an open position. As will be described in greater detail hereinafter, timer 56 also controls switches 107, 129, 130, 137, 190, 191 and 196.

The details of the above-described cycling circuit have been only briefly described, since it is quite conventional in substance.

Figure 4:
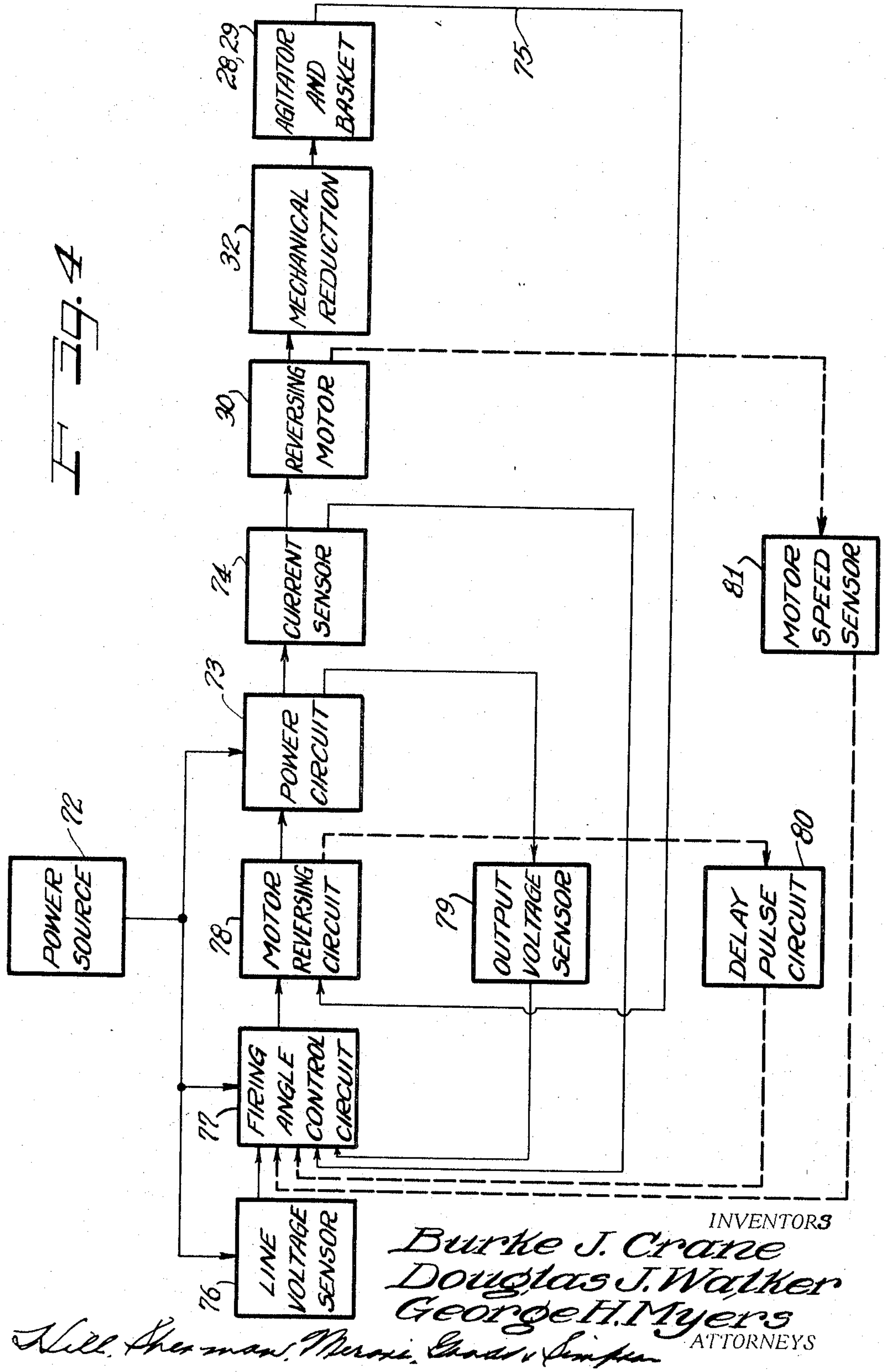
FIGURE 4 is a schematic and block diagram of a preferred form of the present invention.

The motor and control circuit MC referred to in FIGURE 2 is illustrated in expanded block diagram form in FIGURE 4.

A power source 72 is connected through a power circuit 73 to a current sensor 74 and the reversing motor 30. The power circuit 73, when properly triggered or gated, supplies voltage to the reversing motor 30. The current sensor 74 functions as a safety for the reversing motor 30 by sensing excessive currents passing therethrough. The mechanical reduction 32 is connected between an output of the reversing motor 30 and the basket 28 and agitator 29. A motor reversing signal is produced on a line 75 during rotation of the basket 28 or of the agitator 29.

The motor reversing signal may be produced by limit switches connected in the drive system of the basket 28 and agitator 29. If desired, a separate motor oscillation control circuit may be provided which may include an electronic relaxation oscillator in conjunction with a flip-flop control for producing the motor reversing signal on the line 75.

The power source 72 is also connected to a line voltage sensor 76 and to a firing angle control circuit 77. The line voltage sensor 76 responds to changes in line voltage to alter the amount of applied voltage to the reversing motor 30. The firing angle control circuit 77 accurately controls the time within each cycle of the power source voltage when the power circuit 73 will be triggered to supply voltage to the reversing motor 30.

The firing angle control circuit 77 more particularly determines the firing angle at which the power circuit 73 will be triggered to supply voltage to the reversing motor 30. That is, the firing angle control circuit 77 has direct control, through the power circuit 73, of the voltage applied to the reversing motor 30.

A motor reversing circuit 78 is interposed between the firing angle control circuit 77 and the power circuit 73 for selecting the direction of rotation of the reversing motor 30. The motor reversing circuit 78 is actuated by the motor reversing signal on the line 75 which is operative only during the agitate cycle of the machine's operation and is disabled during the spin cycle.

The firing angle control circuit 77, in addition to being independently operative, is controlled from the line voltage sensor 76 and the current sensor 74. In addition, an output voltage sensor 79 is connected between the power circuit 73 and the firing angle control circuit 77 for sensing the voltage supplied through the power circuit 73 to the reversing motor 30, and performs to control the firing angle control circuit accordingly.

If desired, a delay pulse circuit 80 may be connected between the motor reversing circuit 78 and the firing angle control circuit 77 for delaying the application of voltage to the reversing motor 30 upon each reversal of the direction of rotation of the reversing motor 30.

The purpose of the delay pulse circuit 80 is to provide a means for avoiding the sudden application of a reverse magnetic force to the motor following the end of its movement in one direction and prior to its reversal. This delay pulse circuit 80 provides a brief period of no applied power to the motor 30 each time the motor reversing circuit 78 operates to reverse the rotation of the motor 30.

Furthermore, a motor speed sensor 81 may be provided between the reversing motor 30 and the firing angle control circuit 77 for maintaining the speed of the reversing motor 30 within a prescribed range.

More particularly, the motor speed sensor 81 operates to maintain a constant predetermined speed of the motor 30 regardless of the load imposed thereon. The motor speed sensor 81 may take the form of a voltage-current sensitive circuit that is affected by the current through the motor and the voltage thereacross to provide a correction to the firing angle control circuit 77 to compensate for the load imposed on the motor 30. The motor speed sensor 81 may also take the form of a tach-generator system responsive to the speed of the motor 30 and adjusting the power input by controlling the firing angle control circuit 77. It is to be understood, however, that other forms of a motor speed sensor may be employed to provide a constant speed control. At this point in the circuit, a means for providing adjustable speed control may also be utilized. The delay pulse circuit 80 and the motor speed sensor 81 are shown connected into the block diagram of FIGURE 4 with dashed lines to indicate that such circuits are not required, but optional.

Figure 5:
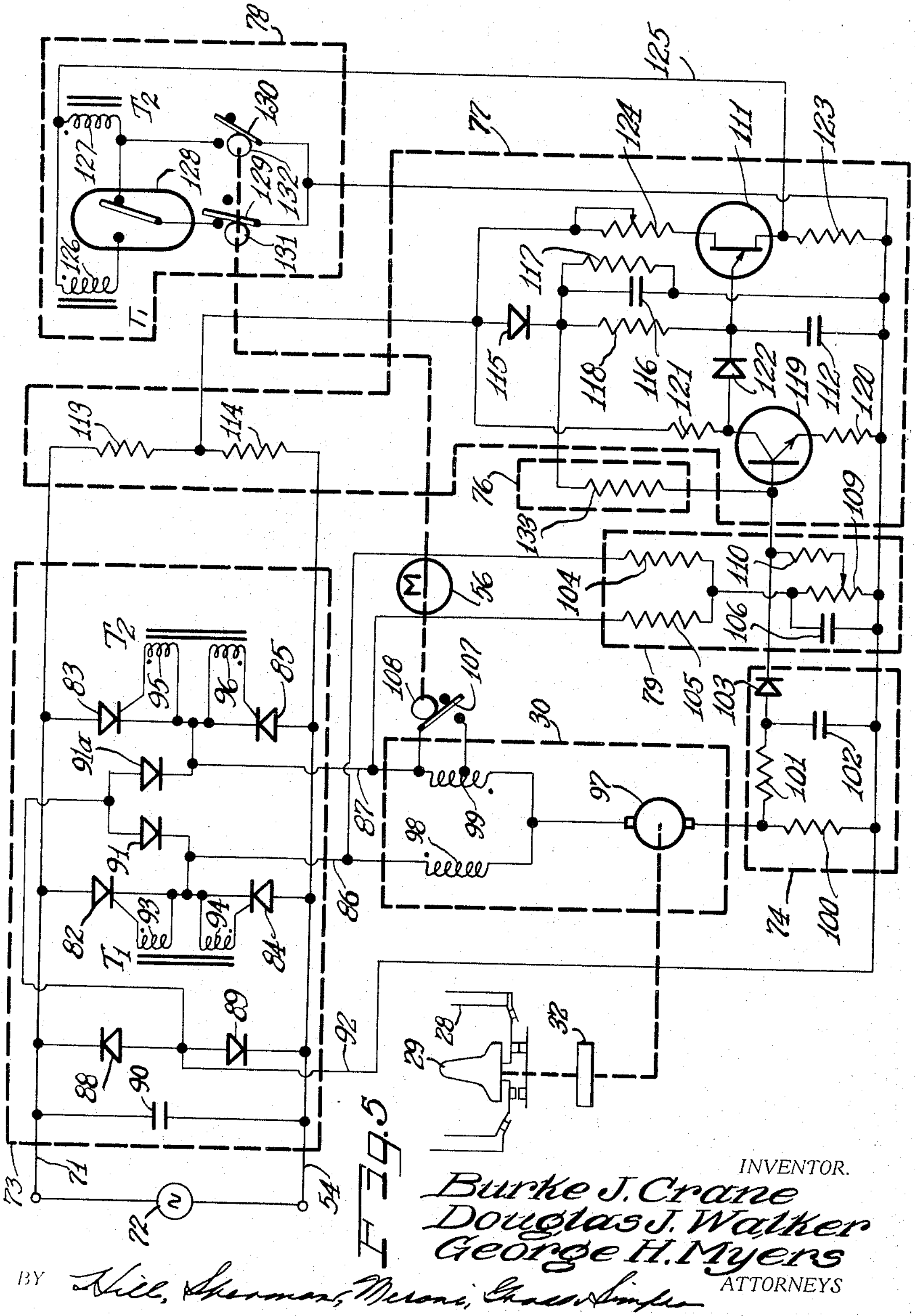
FIGURE 5 is a schematic diagram of a preferred embodiment using a split series DC motor and showing those portions of the block diagram of FIGURE 4 which are connected by solid lines.

One preferred form of the present invention is illustrated in FIGURE 5 wherein the power source 72 is connected to the lines 54, 71 as shown in FIGURE 2 and to the power circuit 73. The power circuit 73 includes a pair of positive cycle conducting silicon controlled rectifiers 82 and 83 having respective anodes thereof connected to the line 71. A pair of negative cycle conducting silicon controlled rectifiers 84 and 85 have respective anodes thereof connected to the line 54. The cathodes of the silicon controlled rectifiers 82, 84 are connected together and to a line 86 as one output of the power circuit 73. Similarly, the cathodes of the silicon controlled rectifiers 83, 85 are connected to a line 87 forming a second output of the power circuit 73. A pair of circuit return rectifiers 88 and 89 are provided within the power circuit 73. A turn-on transient suppressor capacitor 90 is connected between the lines 54, 71 for protecting the semi-conductors within the power circuit 73 and for suppressing the occasional line transients which might accidently fire silicon-controlled rectifiers 82, 83, 84 or 85 within the power circuit 73. Also, a pair of transient suppressing semi-conductor diodes 91 and 91*a* are provided within the power circuit 73.

When the silicon controlled rectifier 82 is triggered on, positive pulses of the power source 72 are supplied on the line 86, causing current flow through the circuit which returns on a line 92 connected to the anodes of the diodes 88, 89. These positive pulses cause a return current flow through the diode 89. Similarly, when the silicon controlled rectifier 84 is triggered on, negative pulses of the power source 72 will be provided on the line 86 as positive pulses, causing a current flow through the remaining circuitry to return on the line 92 and pass through the diode 88 to the line 71. In a like manner, when the silicon controlled rectifier 83 is triggered on, positive pulses of the power source 72 on the line 71 are conducted to the line 87 and cause a current flow through the circuit to return on the line 92 and through the diode 89 to the opposite side of the power source 72 on the line 54. The silicon controlled rectifier 85, when triggered on, conducts negative pulses from the power source 72 on the line 54 to the line 87 as positive pulses and causes a current flow through the circuit to return on the line 92 and through the diode 88 to the oppoiste side of the power source 72 on the line 71. Therefore, the silicon controlled rectifiers 82, 84, during one phase of the operation, form a full wave bridge rectifier circuit with the diodes 88, 89 which has an output developed across the lines 86, 92. Similarly, the silicon controlled rectifiers 83, 85, during a second phase of the operation, form a full wave rectifier bridge with the diodes 88, 89 to provide an output across the lines 87, 92.

A pair of transformers $T_1$ and $T_2$ transfer the necessary triggering pulses to the silicon controlled rectifiers 82–85. More particularly, a pair of secondary windings 93 and 94 of the transformer $T_1$ are connected to respective gate electrodes of the silicon controlled rectifiers 82, 84. Also, a pair of secondary windings 95 and 96 of the transformer $T_2$ are connected to respective gate electrodes of the silicon controlled rectifiers 83, 85. When a pulse is developed within the respective transformers, the corresponding silicon controlled rectifiers will be triggered on allowing full rectification of the power source 72 voltage on either one of the output lines 86, 87.

The reversing motor 30, which in this embodiment is illustrated as being a split series DC motor, includes an armature 97 and a pair of field windings 98 and 99. The output line 86 from the power circuit 73 is connected through the field winding 98 to the armature 97. Similarly, the output line 87 from the power circuit 73 is connected through the field winding 99 to the armature 97. Therefore, it can be readily appreciated that when the transformer $T_1$ is pulsed, the silicon controlled rectifiers 82, 84 will be triggered on, supplying current to the field winding 98 and the armature 97. In a like manner, when the transformer $T_2$ is pulsed, the silicon controlled rectifiers 83, 85 will be triggered on, supplying current through the field winding 99 and the armature 97. The field windings 98, 99 are wound such that energization of one of the field windings 98, 99 will drive the armature 97 in one direction, while energization of the other of the field windings 98, 99 will drive the armature 97 in the opposite direction.

A switch 107 is connected to the field winding 99 and performs to short out a portion of the field winding 99 during spin operation of the complete cycle, thereby driving the armature 97 at a higher speed. The switch 107, as shown in FIGURE 5, is in the agitate position and is actuatable by a cam 108 driven from the timer motor 56. As will be more readily appreciated hereinbelow, during the spin operation of the machine's complete cycle, only the field winding 99 is supplied voltage so that the armature 97 will be driven in the same direction continuously. However, during the agitate cycle of the machine's operation, voltage is alternately supplied first to one of the field windings 98, 99 and then to the other of the field windings 98, 99.

The armature 97 is connected through the mechanical reduction 32 to either the basket 28 during spin operation or to the agitator 29 during agitate operation.

The current sensor circuit 74 is connected in series with the reversing motor 30 and provides a safety feature by sensing excessive currents through the field windings 98, 99 and the armature 97. The current-sensing circuit 74 includes a motor current sensing resistor 100 connected in series with the armature 97 and which resistor 100 develops a voltage thereacross proportional to the current flowing through the motor 30. The voltage developed across the resistor 100 is filtered by means of a resistor 101 and a capacitor 102 and is supplied through a diode 103 to the firing angle control circuit 77. The diode 103 conducts on excessive current peaks to provide a signal to the firing angle control circuit 77 during such excessive current periods.

The outputs of the power circuit 73 on the lines 86, 87 are connected to the output voltage sensor 79 which senses the amount of voltage supplied to the motor 30 during a particular cycle. More particularly, the output line 86 is connected to a resistor 104 and the output line 87 is connected to a resistor 105 in the voltage-sensing circuit 79. The two motor voltage-sensing resistors 104, 105 are each connected to a filter circuit including a capacitor 106 and a potentiometer 109. The movable arm of the potentiometer 109, which is a manual speed selector for the circuit, is connected through a resistor 110 to the firing angle control circuit 77. In this manner, voltage supplied to the motor 30 is sensed in the potentiometer 109 and such voltage is delivered through the resistor 110 to the firing angle control circuit 77 to provide a signal in accordance with the voltage supplied to the motor 30. More particularly, when the motor 30 is being driven in one direction as by energization of the field winding 98, the voltage developed on the output line 86 is fed through the resistor 104 and filtered by the capacitor 106 and potentiometer 109, and a signal corresponding to the voltage on the line 86 is fed through the resistor 110 to the firing angle control circuit 77. Similarly, when the motor 30 is being driven in the opposite direction, as by energization of the field winding 99, the voltage developed on the line 87 is fed through the resistor 105 to the capacitor 106 and potentiometer 109, and a signal corresponding thereto is supplied through the resistor 110 to the firing angle control circuit 77.

The firing angle control circuit 77 includes a unijunction transistor 111 which delivers a pulse to the motor reversing circuit 78 when a predetermined voltage level is achieved at the emitter electrode thereof. The time required for developing such a voltage level which will trigger the unijunction transistor 111 into conduction to deliver the required pulse is determined by that circuitry which controls the charge developed on a capacitor 112 connected to the emitter electrode of the unijunction transistor 111.

The charge developed on the capacitor 112 is primarily derived from the voltage developed at a midpoint between a pair of resistors 113 and 114 connected across the power source 72 on the lines 54, 71. The midpoint between the two resistors 113, 114 is connected to a voltage clipper circuit including a diode 115, a capacitor 116, and a resistor 117. The voltage developed by the clipper circuit is supplied through a resistor 118 to charge the capacitor 112 to a level sufficient to fire the unijunction transistor 111. Upon firing of the unijunction transistor 111, however, the charge developed on the capacitor 112 is completely dissipated and when the unijunction transistor 111 returns to a quiescent state, the capaictor 112 is free to develop a charge again. This described circuitry for charging the capacitor 112, however, will develop a trigger voltage for the unijunction transistor 111 within a prescribed time determined by the RC time constant of the circuit which will not vary. Therefore, in order to vary the charging time of the capacitor 112, a transistor 119 is provided in the circuit which is of the NPN type.

The emitter electrode of the transistor 119 is connected through a resistor 120 to the return line 92, and the collector electrode thereof is connected through a resistor 121 to the midpoint between the two resistors 113, 114. In addition, a diode 122 is connected from the collector electrode of the transistor 119 to the capacitor 112 which is poled to conduct only in a charging direction on the capacitor 112. The value of the resistors 118, 121 have a predetermined ratio with respect to one another such that the conduction state of the transistor 119 will affect the charge on the capacitor 112. Therefore, when the transistor 119 is in a conductive state, most of the charge developed on the capacitor 112 will be derived from a current flow only through the resistor 118. However, when the transistor 119 is in a non-conductive state, most of the charge developed on the capacitor 112 will be derived from a current flow through the resistor 121 and the diode 122. The values of the two resistors 118, 121 are such that when the transistor 119 is non-conducting, the capacitor 112 will charge in a relatively short time, and when the transistor 119 is conducting, the capacitor 112 will charge over a relatively long period of time. Therefore, the time periods between successive triggerings of the unijunction transistor 111 can be varied and controlled by controlling the conduction state of the transistor 119.

The base-1 of the unijunction transistor 111 is connected through a resistor 123 to the return line 92. The base-2 electrode of the unijunction transistor 111 is connected through a variable resistor 124 to the midpoint of the two resistors 113, 114. By such connection of the unijunction transistor 111 into the circuit, a voltage pulse is developed on a line 125 with each successive firing of the unijunction transistor 111. This pulse developed on the line 125 is supplied to the motor reversing circuit 78 to be utilized for controlling the power circuit 73.

The motor reversing circuit 78 includes a primary winding 126 of the transformer $T_1$ and a primary winding 127 of the transformer $T_2$. A magnetic reed switch 128 is provided in the circuit and is directly controllable from the position of the agitator and basket 28, 29, as will be more fully understood hereinbelow. The line 125 carrying the pulses from the firing angle control circuit 77 is connected through each of the primary windings 126, 127 to the respective contact of the magnetic reed switch 128. The movable contact of the magnetic reed switch 128 is connected through a switch 129 to the return line 92. A second switch 130 is provided between the primary winding 127 and the return line 92.

As shown in FIGURE 5, the switches 129, 130 are disposed in the agitate position such that agitate operation may be performed by the circuit. A cam 131 controls the position of the switch 129, and a cam 132 controls the position of the switch 130. The cams 131, 132 are driven by the timer motor 56. During the spin operation of the machine's cycle, the switches 129, 130 are moved to the other position from that shown in the drawing. More particularly, actuation of the switch 129 to the spin position removes the magnetic reed switch 128 from the circuit and actuation of the switch 130 to the spin position locks the primary winding 127 into the circuit continuously. Therefore, during the agitate cycle of the machine's operation, pulses developed on the line 125 may be supplied to either the primary winding 126 or to the primary winding 127 depending upon the position of the magnetic reed switch 128. However, during the spin cycle of the machine's operation, pulses developed on the line 125 are supplied only through the primary winding 127.

These pulses developed in the primary windings 126, 127 are transformer-coupled to the respective secondary windings 93–96 to provide power to the motor 30. When the magnetic reed switch 128 is in the position as shown in the drawing, pulses are developed in the primary winding 127 of the transformer $T_2$ and such pulses are transformer-coupled to the secondary windings 95, 96. These pulses then gate on the silicon controlled rectifiers 83, 85 to supply power to the field winding 99. However, when the magnetic reed switch 128 is in the opposite position from that shown, pulses on the line 125 are supplied to the primary winding 126 of the transformer $T_1$ and are transformer-coupled to the secondary windings 93, 94 to gate on the silicon controlled rectifiers 82, 84 and supply power to the field winding 98. As previously mentioned, the field winding 98, when energized, drives the armature 97 in one direction, while the field winding 99 drives the armature 97 in the opposite direction. The reed switch 128 is controllable from the position of either the agitator or the basket as described in connection with FIGURES 9 and 10.

Another input provided for the firing angle control circuit 77 is from the line voltage sensor 76 which includes a resistor 133 connected between the diode 115 and the base electrode of the transistor 119. Therefore, as the line voltage increases across the lines 54, 71, the conduction level of the transistor 119 is increased thereby compensating for the increased voltage employed for charging the capacitor 112.

In operation, the circuit of FIGURE 5 performs to control the movement of the basket 28 or the agitator 29 by controlling the motor 30. More particularly, the field windings 98, 99 of the motor 30 are selectively energized to provide the desired control over the basket 28 or the agitator 29. Line voltage from the power source 72 is supplied to the firing angle control circuit 77 to charge the capacitor 112 over a predetermined time period. When the capacitor 112 charges to the level required for firing the unijunction transistor 111, the pulse developed will be coupled through pulse transformer $T_1$ to secondary windings 93 and 94 or through pulse transformer $T_2$ to secondary windings 95 and 96. Pulses applied to pulse transformer $T_1$ will fire either silicon controlled rectifier 82 or 84 depending on anode to cathode voltage polarity, while pulses applied to pulse transformer $T_2$ will fire either silicon controlled rectifier 83 or 85, again depending on anode to cathode voltage polarity. Alternate firing of silicon controlled rectifiers 82 and 84 will supply power to field winding 98 to drive motor 30 in one direction while alternate firing of silicon controlled rectifiers 83 and 85 will supply power to field winding 99 to drive motor 30 in the opposite direction. The position of the reed switch 128 determines which of the field windings 98, 99 will be energized at a particular time. Further control of the energization of the field windings 98, 99 is provided by the switches 129, 130, which when actuated to the spin position allow energization of the field winding 99 only. When the switches 129, 130 are placed in the spin position, however, the switch 107 shorts out a portion of the field winding 99 causing the motor 30 to operate at a higher speed. Actuation of the switches 107, 129, and 130 to the agitate position is illustrated by the solid back lines in FIGURE 3.

The circuit illustrated in FIGURE 5 provides three inputs to the firing angle control circuit 77 for controlling the conduction of the transistor 119 and thereby controlling the charging rate of the capacitor 112. One of these inputs is from the current sensor 74 which senses excessive current to the motor 30 and causes the firing angle control circuit 77 to reduce the amount of voltage supplied to the motor 30. Another input to the firing angle control 77 is from the output voltage sensor 79 which provides an input to the transistor 119 proportional to the amount of voltage supplied to the motor 30. If the voltage supplied to the motor 30 increases, the conduction of the transistor 119 is also increased causing the firing angle control circuit 77 to supply a lesser amount of voltage to the motor 30. The third input to the firing angle control circuit 77 is from the line voltage sensor 76 which also increases the conduction of the transistor 119 with increased line voltage.

As the conduction of the transistor 119 increases, the time required for charging the capacitor 112 increases proportionally delaying the triggering of the unijunction transistor 111. Therefore, the silicon controlled rectifiers 82–85 do not begin conduction until the capacitor 112 has charged to the required level to fire the unijunction transistor 111.

Figure 6:
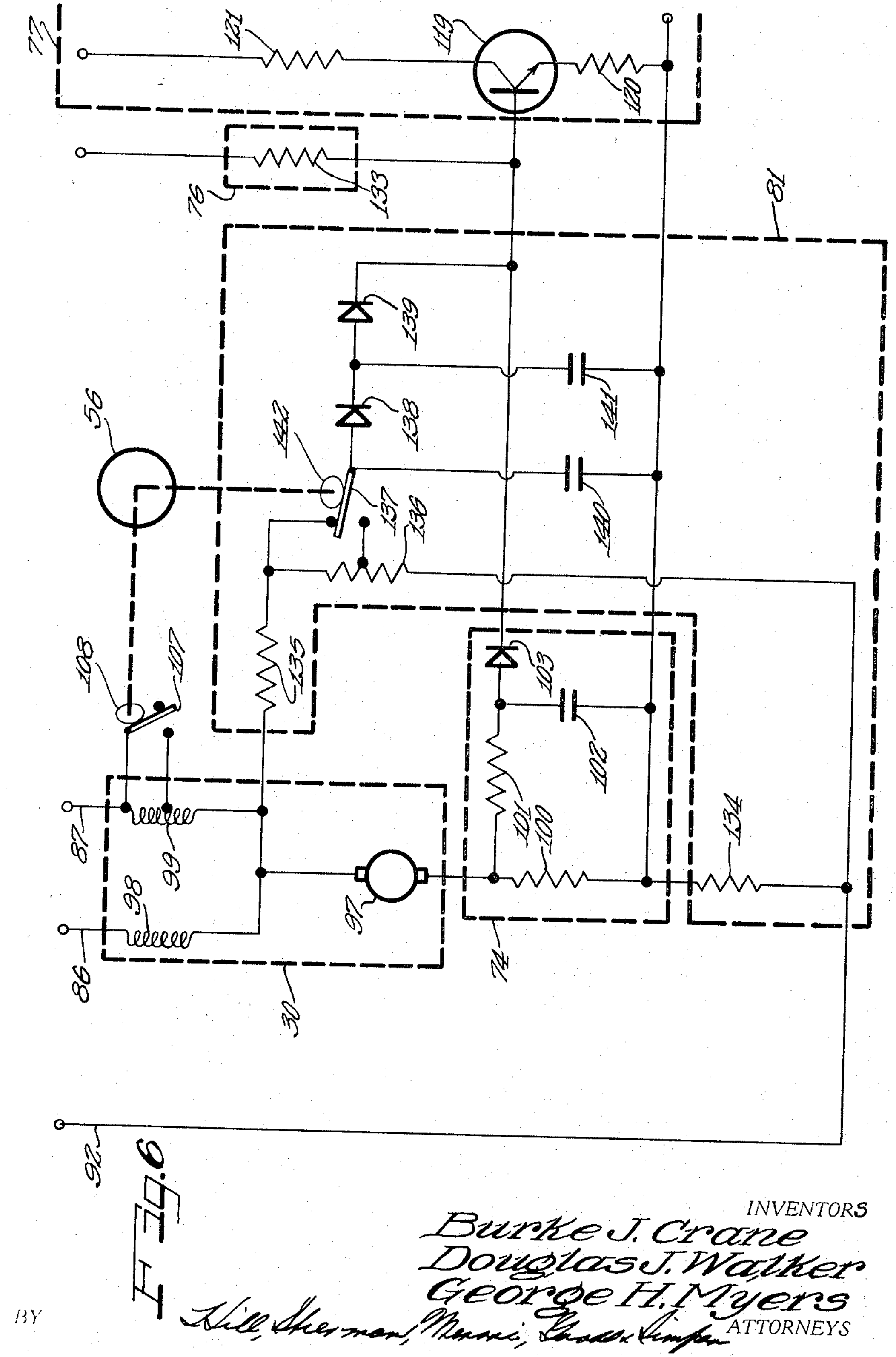
FIGURE 6 is a schematic diagram of a preferred embodiment of a motor speed sensor employed in the block diagram of FIGURE 4.

One preferred form of the motor speed sensor 81 is illustrated in FIGURE 6 and a portion of the circuit of FIGURE 5 is incorporated therein for showing the proper connection of the motor speed sensor 81 into the circuit. The motor speed sensor 81 provides another input to the firing angle control circuit 77. As illustrated in FIGURE 6, the motor speed sensor 81 includes a resistor 134 connected in series with the resistor 100 of the current sensor 74 and connected to the current return line 92. Connected in parallel with the armature 97, the resistor 100, and the resistor 134 are a pair of resistors 135 and 136. A common connection between the resistors 135, 136 is connected through a switch 137 in the agitate position and through a pair of diodes 138 and 139 to the base electrode of the transistor 119 of the firing angle control circuit 77. Filter capacitors 140 and 141 are connected from the anodes of the respective diodes 138, 139 to a common connection between the resistors 100, 134. The switch 137 is controlled by a cam 142 connected to the timer motor 56 and actuatable in a like manner with the switch 107. The spin position of the switch 137 connects a tap of the resistor 136 through the diodes 138, 139 to the firing angle control circuit 77.

The armature 97 and the resistors 100, 134, 135, and 136 constitute a bridge-type circuit for sensing and controlling the speed of the motor 30 which speed can be determined by the following formula:

$$\text{Motor speed} = K_m[R_{134}\left(\frac{R_{135}}{R_{136}}\right) - (R_a + R_{100})]$$

in which $K_m$=motor constant,
$R_a$=resistance of armature 97,
$R_{134}$=resistance of the resistor 134,
$R_{135}$=resistance of the resistor 135, and
$R_{136}$=resistance of the resistor 136.

This formula is derived from the following:

$$\text{Motor speed}=\frac{E_a}{I_a}K_m$$

in which $E_a$=armature reaction
$I_a$=armature current
$K_m$=motor constant

The above apply for a series DC motor in which the field is not saturated.

The output voltage is always about the same regardless of motor speed. However, since the circuit including the resistors 134, 135, 136 is a bridge network, a change in speed from the desired speed will cause a change in this output voltage. It is this change that is amplified by transistor 119 to control motor speed.

The switch 137, when actuated to the spin position, alters the $$\frac{R_{135}}{R_{136}}$$

factor in the above formula and consequently alters the signal supplied to the transistor 119 to allow increased motor speed. The output of the bridge circuit is altered by the position of the switch 137 such that in the agitate position thereof, a greater output is derived than that derived in the spin position thereof. These two outputs provide, during their respective cycles, a fourth input to the firing angle control circuit 77 to maintain the speed of the motor 30 within a prescribed range.

Figures 7, 8:
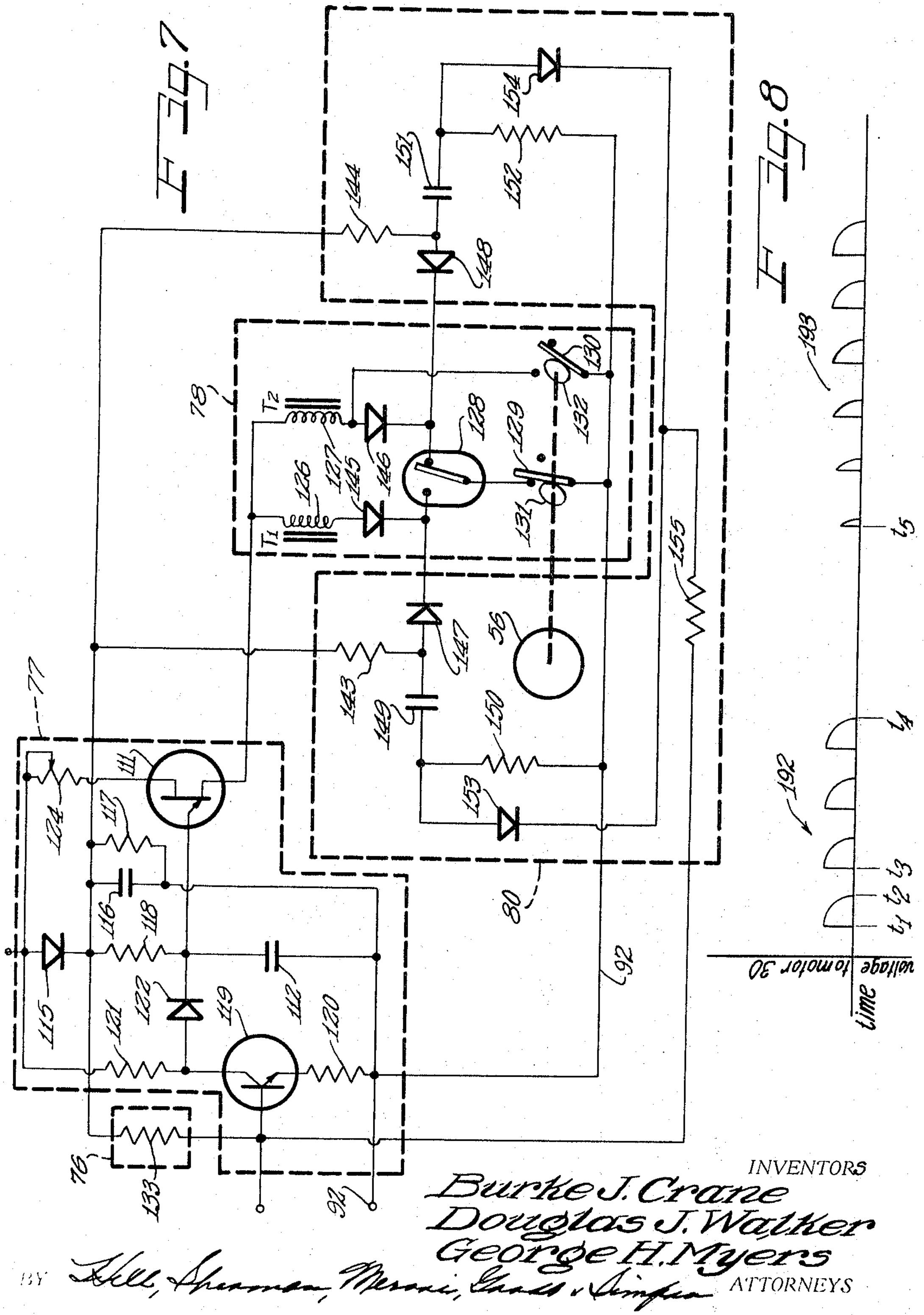
FIGURE 7 is a schematic diagram of a preferred embodiment of a pulse delay circuit employed in the block diagram of FIGURE 4.
FIGURE 8 is a graph illustrating a wave form of voltage applied to the motor of FIGURE 4 and illustrating more specifically the function of the firing angle circuit.

The preferred embodiment of the delayed pulse circuit 80 is illustrated in FIGURE 7 and is shown in combination with the firing angle control circuit 77 and the motor reversing circuit 78. Employment of the delay pulse circuit 80, in the general combination of the present invention, requires the removal of the resistor 123 from the circuit illustrated in FIGURE 5. With that exception, all other components of FIGURE 5 are retained and the delay pulse circuit 80 is provided in the circuit for delaying the application of voltage to the motor 30 during a reversal thereof and until the armature 97 has completed its movement in one direction and prior to its movement in the opposite direction.

As illustrated in FIGURE 7, a voltage is derived from the clipper circuit including the diode 115, the capacitor 116, and the resistor 117, which voltage is provided to a pair of resistors 143 and 144. The base-1 of the unijunction transistor 111 is connected through the primary windings 126, 127 and through a pair of diodes 145 and 146 respectively, to opposite contacts of the reed switch 128.

As in FIGURE 5, when the reed switch 128 and the switches 129, 130 are in the positions shown, a pulse developed by the triggering of the unijunction transistor 111 will be supplied through the primary winding 127 of the transformer $T_2$ to induce a gating pulse in the secondary winding 95, 96 (FIGURE 5). When the reed switch 128 is in the opposite position from that shown in FIGURE 7, however, a pulse developed by the triggering of the unijunction transistor 111 will be developed across the primary winding 126 of the transformer $T_1$ and transformer-coupled to the secondary windings 93, 94 to gate on the silicon controlled rectifiers 82, 84.

As also described in conjunction with FIGURE 5, when the switches 129, 130 are disposed in the opposite position from that shown in FIGURE 7, pulses developed by the triggering of the unijunction transistor 111 will only be realized in the primary winding 127 of the transformer $T_2$. Therefore, only the silicon controlled rectifiers 83, 85 will be gated on by transformer-coupling of the pulse from the primary winding 127 to the secondary windings 95, 96 of the transformer $T_2$.

During switching of the reed switch 128, however, it is desired to derive a signal which will cause the firing angle control circuit 77 to delay a predetermined time period before triggering of the unijunction transistor 111. This delay pulse is derived from the delay pulse circuit 80 which includes a pair of diodes 147 and 148 having their anodes connected through resistors 143, 144 respectively, to the clipper circuit voltage. The cathodes of the diodes 147, 148 are connected to the cathodes of the diodes 145, 146 respectively. The anode of the diode 147 is connected through a capacitor 149 and a resistor 150 to the circuit return line 92. Similarly, the anode of the diode 148 is connected through a capacitor 151 and a resistor 152 to the circuit return line 92. A common connection between the capacitor 149 and the resistor 150 is connected to the anode of a diode 153, and the common connection between the capacitor 151 and the resistor 152 is connected to the anode of a diode 154. The cathodes of the diodes 153, 154 are connected to one another and through a resistor 155 to the base electrode of the transistor 119 of the firing angle control circuit 77.

This circuit arrangement provides a delay pulse to the firing angle control circuit 77 upon each actuation of the reed switch 128. If, for instance, the reed switch 128 is in the position illustrated in FIGURE 7, the voltage from the clipper circuit will be developed across the resistor 144. Subsequently, when the reed switch 128 switches to the opposite contact from that shown, a charge will be developed across the capacitor 151 causing a voltage drop to be developed across the resistor 152. This developed voltage drop on the resistor 152 will produce a positive pulse of voltage through the diode 154 and the resistor 155 to the base of the transistor 119. Increasing the potential on the base of the transistor 119 increases the conduction therethrough causing the unijunction transistor 111 to delay in its firing time.

This positive delay pulse is also developed when the reverse situation occurs. That is, when the reed switch 128 is in the opposite position from that shown initially, a voltage will be developed across the resistor 143. When the read switch 128 is actuated from that position, the capacitor 149 will charge and develop a pulse through the diode 153 and the resistor 155 to again drive the transistor 119 into conduction.

The operation of the firing angle control circuit 77 and the delay pulse applied thereto from the delay pulse circuit 80 is better illustrated by the wave forms in FIGURE 8. For purposes of better understanding, it will be assumed that the positive going pulses indicated by the reference numeral 192 will be those realized across the field winding 98, while the positive going pulses indicated by the reference numeral 193 will be those realized across the field winding 99 of the motor 30 (FIGURE 5).

At a time $t_1$ (FIGURE 8) the unijunction transistor 111 (FIGURE 5) fires to develop a pulse in the primary winding 126 of the transformer $T_1$ turn on the silicon controlled rectifiers 82, 84 having their gate electrodes connected to the secondary windings 93, 94 of the transformer $T_1$. A positive pulse of the voltage then appearing across the lines 54, 71 will be conducted through the silicon controlled rectifier 82 until that voltage reaches a zero point at time $t_2$. At such time $t_2$, the silicon controlled rectifier 82 will be turned off by reversed voltage and the silicon controlled rectifier 84 will be prepared for conduction by another firing pulse developed by the unijunction transistor 111 at a subsequent time $t_3$.

This operation continues until the motor reversing circuit 78, by operation of the reed switch 128, changes the application of pulses from the primary winding 126 of the transformer $T_1$ to the primary winding 127 of the transformer $T_2$. Actuation of the reed switch 128 occurs at such time subsequent to and relatively adjacent an illustrated time $t_4$. The delay pulse, through the resistor 155 (FIGURE 7), restricts the firing of the unijunction transistor 111 until a time $t_5$, at which time the reed switch 128 is in position for allowing pulses to be applied to the primary winding 127 of the transformer $T_2$. The pulses developed in the primary winding 127 are transformer-coupled to the secondary windings 95, 96 to gate on the silicon controlled rectifiers 83, 85, and supply voltage to the field winding 99 to reverse the direction of rotation of the motor 30.

Actuation of the reed switch 128 may be accomplished with a variety of means, as desired. For instance, the reed switch 128 may be two microswitches actuated by suitable means mounted on the agitator shaft 44. FIGURE 9 illustrates one preferred embodiment of a system for actuating the reed switch 128. A plate 214 is mounted on the agitator shaft 44 and includes a pair of switch actuators 215 and 216 mounted at equal radial distances from the center thereof. The switch actuators 215, 216 are disposed for actuating the reed switch 128 upon each pass of the actuators 215, 216 over the switch 128.

Preferably, the reed switch 128 is a magnetic actuatable switch which is actuated to one position by a north pole of a magnet and actuated to the other position by a south pole of a magnet. As illustrated in FIGURE 10, the switch actuators 215, 216 are defined by a pair of magnets mounted on the plate 214. As the plate 214 rotates in accordance with rotation of the motor 30, the pole of each magnet 215, 216 adjacent the periphery of the plate 214 passes over the reed switch 128 causing the switching action. Therefore, if the reed switch 128 is actuated to one position when, for instance, a north pole of the magnet 215 passes thereover, reversal of motor rotation will occur.

Figure 11:
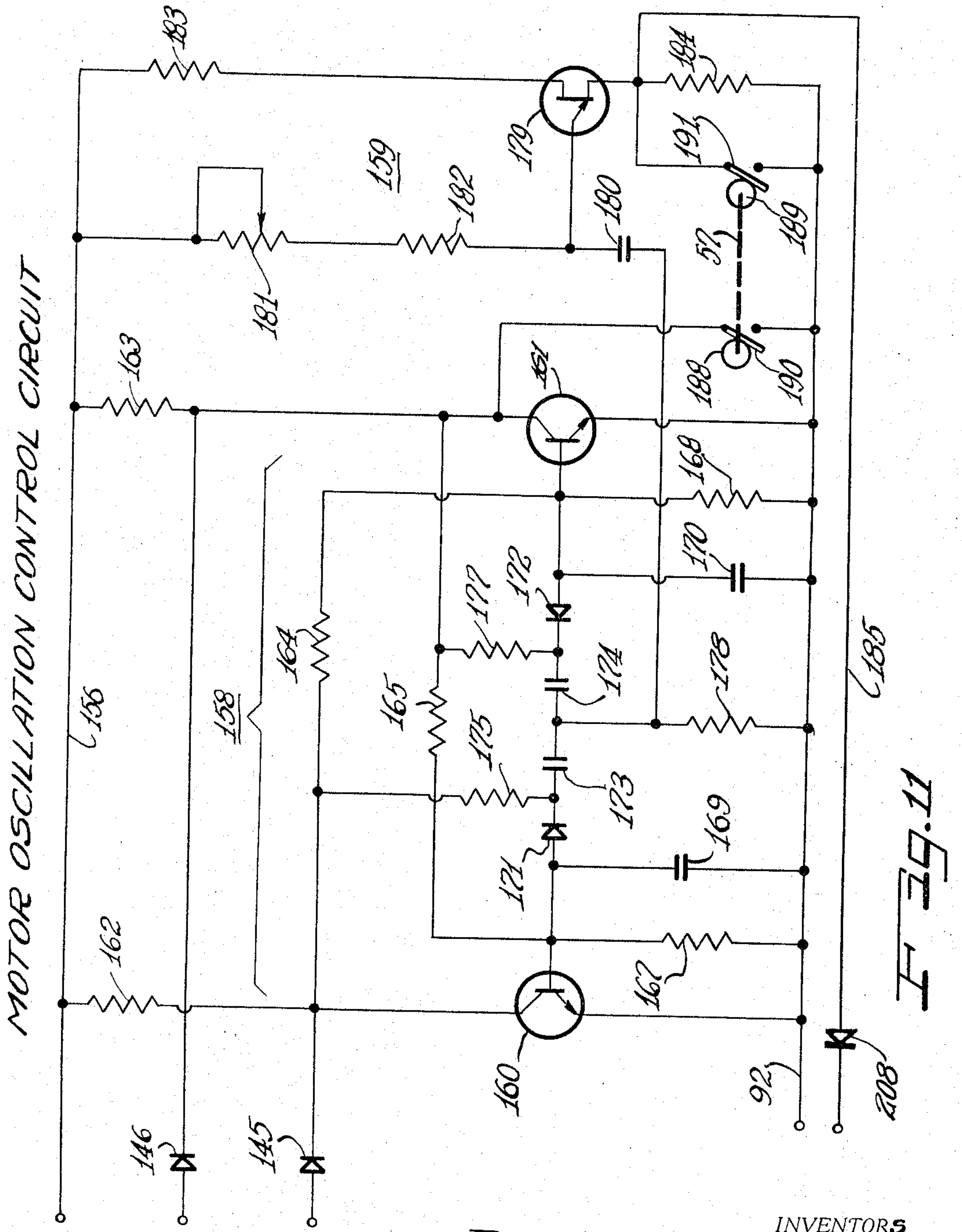
FIGURE 11 is a schematic diagram of another embodiment of a motor reversing circuit and delay pulse circuit.

FIGURE 11 illustrates one preferred embodiment of a motor oscillation control circuit which may be employed in place of the motor reversing circuit 78 and the delay pulse circuit 80. The motor oscillation control circuit of FIGURE 11 performs the switching operation for determining which of the primary windings 126, 127 will receive a trigger pulse for inducing a voltage in the respective secondary windings 82–85 to allow conduction of current to the motor 30. The motor oscillation control circuit illustrated in FIGURE 11 includes a flip-flop circuit 158 and a relaxation oscillator circuit 159. The diode 145 of FIGURE 7 is connected through the collector and emitter respectively of a transistor 160 to the circuit return line 92. Likewise, the diode 146 (FIGURE 7) is connected through the collector and emitter respectively of a transistor 161 to the circuit return line 92.

When either of the transistors 160, 161 is biased to a state of conduction, current will be allowed to flow through the primary windings 126, 127 connected to the diodes 145, 146 respectively. However, when one of the transistors 160, 161 is conducting, the other transistor is biased to a state of nonconduction. In this manner, pulses can be applied to only one of the primary windings 126, 127 at a particular time. Such arrangement eliminates the possibility of having current flowing through the field windings 98, 99 simultaneously.

As illustrated in FIGURE 11, supply voltage on a line 156 derived from the clipper circuit of FIGURE 5 is connected through a resistor 162 to the collector of the transistor 160 and through a resistor 163 to the collector of the transistor 161. The collector of the transistor 160 is connected to the base of the transistor 161 through a resistor 164. Likewise, the collector of the transistor 161 is connected to the base of the transistor 160 through a resistor 165. The base electrodes of the transistors 160, 161 are connected through resistors 167 and 168 respectively, to the circuit return line 92. A capacitor 169 is connected in shunt with the resistor 167 and a capacitor 170 is connected in shunt with the resistor 168. The anodes of a pair of diodes 171 and 172 are connected to respective base electrodes of the transistors 160, 161. A pair of coupling capacitors 173 and 174 are series connected between the cathodes of the diodes 171, 172. A resistor 175 is connected from between the diode 171 and the capacitor 173 to the collector of the transistor 160 and a resistor 177 is connected from between the diode 172 and the capacitor 174 to the collector of the transistor 161. A resistor 178 is connected from between the capacitors 173, 174 to the circuit return line 92.

The flip-flop circuit 158 is triggered by the application of a pulse of voltage across the resistor 178. This voltage pulse is derived from the relaxation oscillator circuit 159.

When a voltage pulse is developed across the resistor 178, the conducting one of the transistors 160, 161 will be rendered non-conductive and the other conductive to switch the firing pulses from one of the primary windings 126, 127 to the other. If it is initially assumed that the transistor 160 is conducting, and that the transistor 161 is non-conducting, the collector of transistor 160 will be disposed at a relatively low potential with respect to the potential on the collector of the transistor 161. Therefore, the potential on the collector of the transistor 160 will set the voltage on the base electrode of the transistor 161 through the voltage-dividing network of the resistors 164, 168. Likewise, the potential on the collector of the transistor 161 will set the bias level on the base electrode of the transistor 160 through the voltage-dividing network of resistors 165, 167. Since the transistors 160, 161 are of the NPN type, a relatively low voltage on the base of the transistor 161 will maintain it in a non-conductive state while a relatively high potential on the base of the transistor 160 will maintain it in its conductive state. However, when a voltage is developed across the resistor 178 by current flowing therethrough, the base of the transistor 160 will decrease in potential with respect to the emitter causing the transistor 160 to become less conductive.

The reducing conduction of the transistor 160 results in an increasing potential developed from its collector through the resistor 164 to the base of the transistor 161. As the potential between the base and the emitter of the transistor 161 becomes positive, the transistor 161 begins to conduct. Such conduction through the transistor 161 lowers the collector potential thereof resulting in a decrease of potential applied to the base of the transistor 160 through the resistor 165.

This interaction is cumulative to the point that as the transistor 160 is rendered less conductive, the transistor 161 is rendered more conductive until complete interchange of the conduction states occurs between the transistors 160, 161. When a subsequent pulse is developed across the resistor 178, the transistor 161 commences to become non-conductive and the transistor 160 commences to become conductive. The action is again cumulative to the point that the conduction states of the transistors 160, 161 are alternately changed by subsequent voltage pulses developed across the resistor 178. It can be seen that the flip-flop circuit 158 is of the negative steering type, since only a negative signal from the oscillator 159 will result in a switching operation therein. Diodes 171 and 172 are steering diodes and allow a negative voltage pulse across resistor 178 to turn off the conducting transistor.

The oscillator circuit 159 operates in a free running condition to periodically provide voltage pulses on the resistor 178. The oscillator circuit 159 includes a unijunction transistor 179 having an emitter connected through a capacitor 180 to one end of the resistor 178 and to the capacitors 173, 174. The supply voltage on the line 156 is connected to the capacitor 180 through an adjustable resistor 181 and a fixed resistor 182. The supply voltage is also connected from the line 156 to the base-2 of the unijunction transistor 179 through a resistor 183. The base-1 of the unijunction transistor 179 is connected through a resistor 184 to the circuit return line 92.

The capacitor 180, initially uncharged, begins to charge through the resistors 181, 182 until the firing level of the unijunction transistor 179 is attained. When the capacitor 180 is charged to the firing level of the unijunction transistor 179, it fires, causing current flow through the resistor 178, thereby developing the trigger pulse thereacross necessary for altering the states of the flip-flop circuit 158. The time of charge of the capacitor 180 determines the length of time that the transistors 160, 161 will remain in one of their stable states. This time of charge is determined by setting the value of the variable resistor 181 in circuit with the capacitor 180. This controls the stroke rate of agitator 29.

Figure 14:
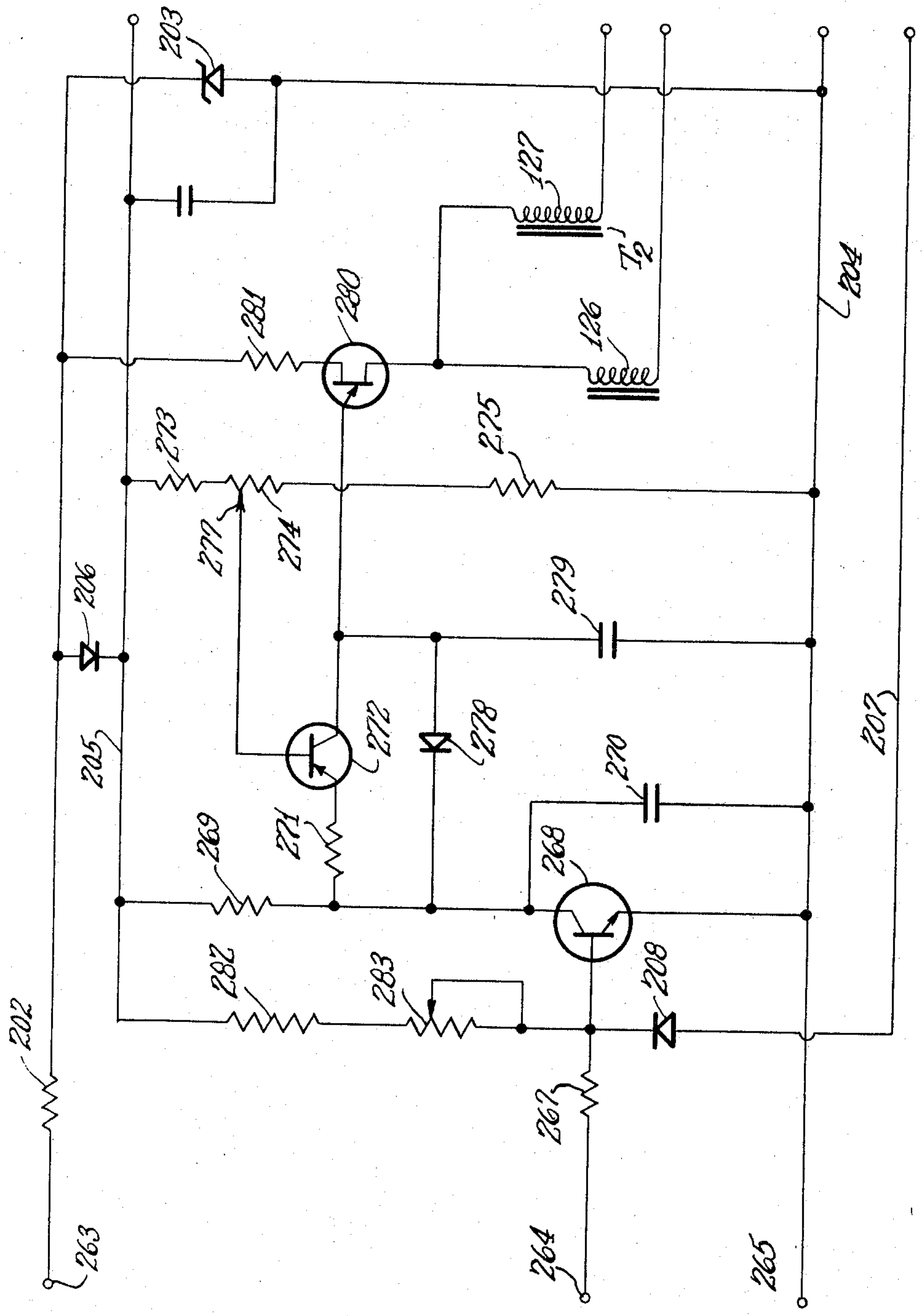
FIGURE 14 is a schematic diagram of an alternate form of a firing angle circuit.

In addition, the oscillator 159 provides a delay pulse to the firing angle control circuit 77 at each firing thereof. That is, each time the oscillator 159 fires to reverse the rotational direction of the armature 97, a delay pulse is developed on a line 185 to disable the firing angle control circuit 77 for a predetermined time. The line 185 is connected through a diode 208 to the base of the transistor 268 (FIGURE 14). This delay pulse is of a relatively high positive value and, therefore, the unijunction transistor 111 will temporarily not fire, causing cut-off power to the motor 30. The function of this delay pulse is to allow the motor 30 to approach or coast to a stop under the influence of a load thereon, thereby eliminating the necessity of braking the motor rotation with reverse magnetic forces. Provision of this delay pulse, therefore, conserves energy and reduces shock on the motor and associated components.

In the motor oscillation control circuit of FIGURE 11, a pair of cams 188 and 189 are provided on the common shaft 57 and are controllable from the timer motor 56 to control the actuation of a pair of switches 190 and 191 respectively. The switch 190 is connected in shunt across the collector and emitter electrodes of the transistor 161, and the switch 191 is connected in shunt across resistor 184 between the base-1 of the unijunction transistor 179 and the circuit return line 92.

As shown in FIGURE 3, the switches 190, 191 are closed during the spin portion of the cycle to disable the flip-flop circuit 158 and terminate the delay pulse applied to transistor 119. The closure of switch 190 allows conduction of firing pulses from the unijunction transistor 111 through the primary winding 127 of the transformer $T_2$ as shown in FIGURE 7. Therefore, the switch 190, when closed, allows rotation of the armature 97 in only one direction. Closure of the switch 191 shorts out the base of the unijunction transistor 179 to discontinue delay pulses during the spin or extraction cycle.

Therefore, selection of either one of the transformers $T_1$, $T_2$ is accomplished by the motor oscillation control circuit, FIGURE 11. If the transistor 160 is conducting, firing of the unijunction transistor 111 will induce a voltage pulse in the transformer $T_1$. If, however, the transistor 161 is conducting, firing of the unijunction transistor 111 will induce a voltage pulse in the transformer $T_2$. Each successive firing of the unijunction transistor 179 will cause alternate conduction of the transistors 160, 161. Adjustment of the resistor 181 adjusts the time interval between successive motor reversals by controlling the charge time of the capacitor 180 and consequently the firing time of the unijunction transistor 179. Therefore, adjustment of the resistor 181 varies the agitation rate (stroke per minute) of the agitator (or alternating rotary motion of a drum, if the general circuit is used on a horizontal-axis machine).

Actuation of the switches 190, 191 into their closed position will allow a voltage pulse to be developed only in the transformer $T_2$ and will eliminate the application of a delay pulse on the line 185. From FIGURE 3 it can be seen that the switches 190 and 191 are closed simultaneously to allow conduction through the power circuit 73 to only the field winding 99. Using a portion of the field winding 99 by movement of switch 107 (FIGURE 5) to the spin position will allow the armature 97 to rotate at a relatively fast speed in that single direction dictated by a current flow through the field winding 99.

Figure 12:
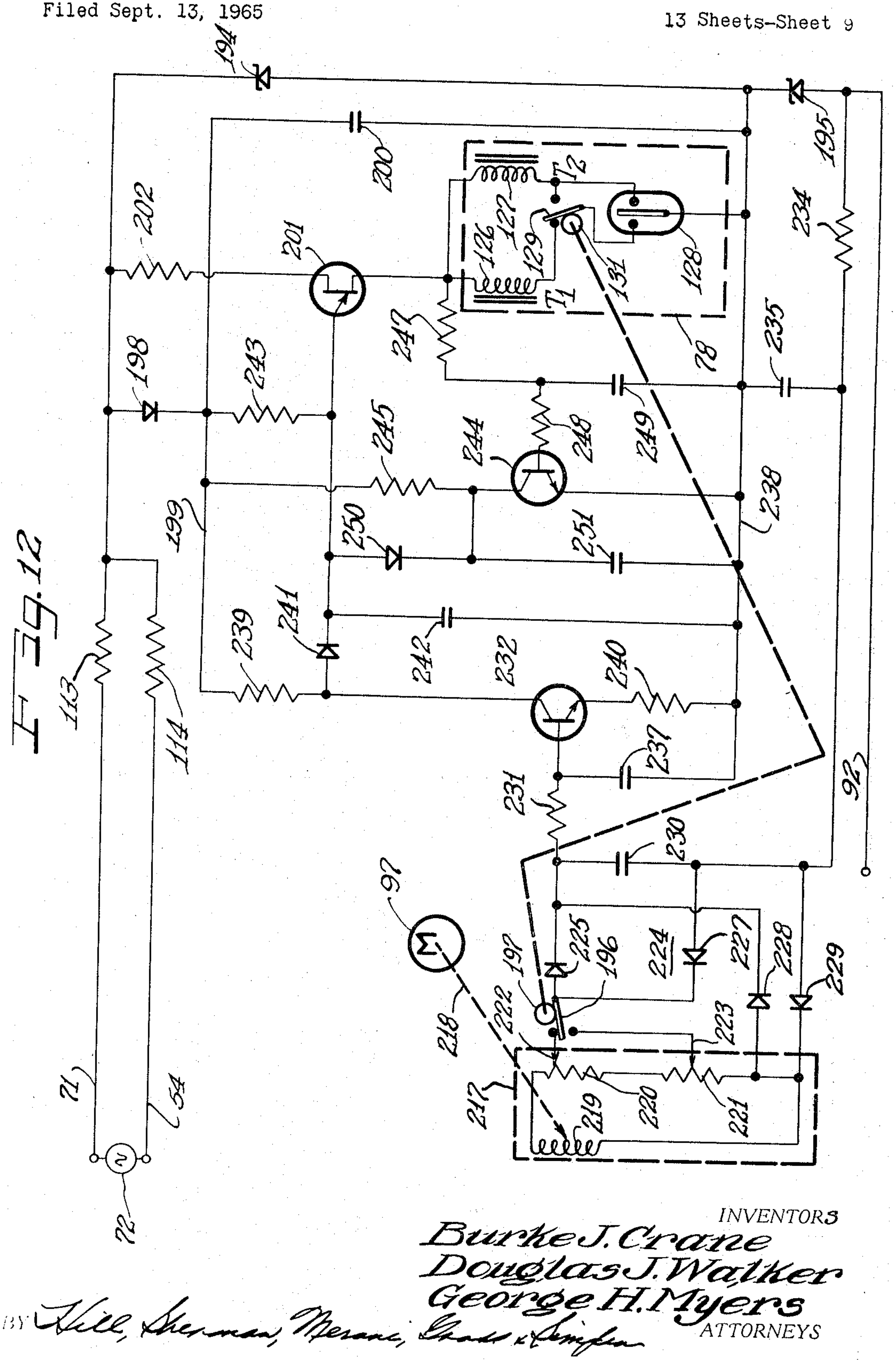
FIGURE 12 is a schematic diagram of still another embodiment of the power control circuits, motor, and speed control feedback which may be employed in the block diagram illustrated in FIGURE 4.

Another embodiment of the motor oscillation control and motor reverse delay pulse circuit is illustrated in FIGURE 12 wherein like reference numerals are employed to designate the same or similar structures as those illustrated in the preceding figures.

Voltage from the power source 72 is supplied across the lines 54, 71 and through the resistors 113, 114 to a voltage clipping circuit. This arrangement of supplying voltage to the circuit is similar to that of FIGURE 5. However, as illustrated in FIGURE 12, the voltage clipping circuit includes a pair of zener diodes 194 and 195 connected in series between the common connection of the resistors 113, 114 and the circuit return line 92. The zener diodes 194, 195 maintain a constant level of voltage at the respective cathode electrodes thereof.

A tachometer generator 217 is responsive to a speed output of the armature 97, as indiacted by the dashed line 218. The tachometer 217 includes a sensing coil 219 which has a voltage developed thereacross which is proportional to the speed of the armature 97. A pair of resistors 220 and 221 are series connected with one another and in parallel with the sensing coil 219. An output from the resistor 220 on a slider arm 222 in contact therewith is indicative of an agitation speed of the armature 97. A second output from the resistor 221 on a slider arm 223 in contact therewith is indicative of a spin speed of the armature 97. The two outputs from the slider arms 222, 223 are selectively connected to a rectifier and filter circuit 224 by means of a switch 196 operable by a timer can 197.

The rectifier and filter circuit 224 is comprised of a full wave bridge rectifier circuit including diodes 225, 227, 228 and 229. A capacitor 230 is connected across the full wave bridge rectifier circuit for providing a substantially constant DC level at an output thereof indicative of the speed of the armature 97.

An output of the rectifier and filter circuit 224 is coupled through a resistor 231 to the base of a transistor 232. A negative terminal of the rectifier and filter circuit 224 is connected to the junction of a resistor 234 and a capacitor 235. An output of the tach generator 217 and the rectifier and filter circuit 224 is compared to the voltage of the zener diode 195 connected between the anode of the zener diode 194 and the circuit return line 92. The voltage of zener diode 195 is filtered by the capacitor 235 and the resistor 234. A capacitor 237 is connected between the base of the transistor 232 and a line 238 and the capacitor 235 is connected between the line 238 and the end of resistor 234.

A blocking diode 198 is connected from the common connection of the resistors 113, 114 to a line 199 and supplies the constant voltage developed by the zener diode 194 thereto. A capacitor 200 is connected from the line 199 to the line 238 and filters the voltage thereacross.

The supply voltage on the line 199 is connected through a resistor 239 to the collector of the transistor 232 and the emitter thereof is connected through a resistor 240 to the line 238. The anode of a diode 241 is connected to the collector of the transistor 232 and a capacitor 242 is connected between the cathode of the diode 241 and the line 238.

The cathode of the diode 241 is connected to the emitter of a unijunction transistor 201 and a resistor 243 is connected between the line 199 and the emitter of the unijunction transistor 201. The resistor 239 is of a smaller value of resistance than that of the resistor 243. The circuit described to this point performs similarly to the firing angle control circuit 77 of FIGURE 5 and allows control of the charge time for the capacitor 242 and, consequently, the firing time of the unijunction transistor 201.

A base-1 of the unijunction transistor 201 is connected through one branch of the motor reversing circuit 78, including the primary winding 126 of the transformer $T_1$, the switch 129, and the reed switch 128, and through another branch including the primary winding 127 of the transformer $T_2$, the switch 129 and the reed switch 128 to the line 238. This arrangement is slightly altered from that illustrated in FIGURE 5, in that only the timer operated switch 129 is employed to change from agitate to spin operation. When the switch 129 is in the position shown in FIGURE 12, firing pulses from the unijunction transistor 201 can be fed to either of the primary windings 126, 127 depending upon the position of the reed switch 128. However, when the switch 129 is actuated to the spin position, firing pulses can only be supplied through the primary finding 127 of the transformer $T_2$.

Delay of the firing pulses during a reversal of the armature 97 is provideed by a network including a transistor 244 having its emitter connected to the line 238 and its collector connected through a resistor 245 to the line 199. The base-1 of the unijunction transistor 201 is connected through a pair of resistors 247 and 248 to the base of the transistor 244. A capacitor 249 is connected from between the resistors 247, 248 to the line 238. A diode 250 is connected from the emitter of the unijunction transistor 201 to the collector of the transistor 244 and a capacitor 251 is connected between the collector and emitter electrodes of the transistor 244. The base-2 of the unijunction transistor 201 is connected through a resistor 202 to the common connection between resistors 113, 114.

The reed switch 128 is actuated by the structures of the type illustrated in FIGURES 9 and 10 to provide alternate reversal of the armature 97. In the present embodiment, however, because of the use of the one switch 129 only, a slight delay occurs during the transfer of pulses from the one primary winding 126, 127 to the other during actuation of the reed switch 128. That is, when the switch 129 is disposed in the position shown in FIGURE 12, which is the agitate position, pulses may be supplied to either one of the primary windings 126, 127 depending upon the position of the reed switch 128. Therefore, because of the time required for the contact arm of the reed switch 128 to move from one contact to the other, a slight delay occurs in the application of firing pulses to the other one of the primary windings 126, 127. During this slight delay, the base-1 of the unijunction transistor 201 rises to a high potential causing the capacitor 249 to charge to a sufficient level to render the transistor 244 conductive. Conduction of current through the transistor 244 removes any charge developed on the capacitor 251.

Since the capacitor 251 is connected in parallel with the capacitor 242 through the diode 250, the charge time of the capacitor 242 is dependent upon the amount of charge developed on the capacitor 251. The capacitance value of the capacitor 251 is sufficiently large to cause the charge time of the capacitor 251 to be substantially longer than the charge time of the capacitor 242. Therefore, if the capacitor 251 is initially uncharged, any charge developed on the capacitor 242 will be shunted through the diode 250 to charge the capacitor 251 equally. However, when the capacitor 251 is at a charged condition, firing of the unijunction transistor 201 will not remove the charge therefrom and subsequent charging of the capacitor 242 will not be shunted through the diode 250 to the capacitor 251. Therefore, each time the reed switch 128 is actuated, the transistor 244 will remove any charge on the capacitor 251 and consequently delay the charging time of the capacitor 242. This delay action occurs at each reversal of the motor 30.

A modified form of the power circuit 73, the motor 30, and the motor speed sensor 81 is illustrated in FIGURE 13. As shown therein, alternating current is supplied between the lines 54–71 from the power source 72 to a full wave bridge rectangular circuit 252. The rectifier circuit 252 includes a pair of diodes 253 and 254 for conducting positive pulses of the supply voltage to the load in one sense and a pair of diodes 255 and 257 for supplying negative pulses of the supply voltage in the same sense across the load. The power circuit 73 includes a silicon controlled rectifier 258 connected in series with the field winding 98 and having a gate electrode thereof connected to the secondary winding 93 of the transformer $T_1$. The power circuit 73 also includes a silicon controlled rectifier 259 connected in series with the field winding 99 of the motor 30 and having a gate electrode thereof connected to the secondary winding 95 of the transformer $T_2$. The armature 97 is connected in series with each of the field windings 98, 99. With this circuit arrangement, the power circuit 73 requires only two silicon controlled rectifiers instead of four, such as illustrated in FIGURE 5, for example, since the supply voltage is rectified initially by the rectifier circuit 252.

The modified motor speed sensor circuit 81, illustrated in FIGURE 13, includes a resistor 260 connected in series with the armature 97. A filter capacitor 261 in series with a resistor 262 are connected in parallel with the resistor 260 for smoothing out the pulsating voltage developed across the resistor 260. An output indicative of the current in the armature 97 is provided across the capacitor 261 and between a pair of terminals 264 and 265. This circuit arrangement provides a signal on the terminal 264 which is negative with respect to the voltage on the terminal 265 for controlling the firing angle control circuit 77 of FIGURE 5. It should be noted that in this type of circuit, the speed regulation is not quite as good as in the previously described embodiments, as the armature current is proportional to the torque and not the speed of the motor 30.

A modified form of the firing angle control circuit 77, which may be employed in conjunction with the circuit illustrated in FIGURE 11 or with any of the other circuits illustrated herein, is shown in FIGURE 14. As shown therein, a signal indicative of the armature 97 current on the terminal 264 is applied through a resistor 267 to the base of a transistor 268.

Because of the full wave bridge rectifier circuit 252 employed in the circuit illustrated in FIGURE 13, pulsating voltage is supplied to a terminal 263 which is common in both FIGURES 13 and 14. Pulsating voltage on the terminal 263 is supplied through a current limiting resistor 202 to the cathode of a zener diode 203. The zener diode 203 is connected between the resistor 202 and a line 204 connected to the terminal 265 and clips the supply voltage to a predetermined level at the cathode electrode thereof. This clipped voltage provides a supply voltage on a line 205 through a blocking diode 206. The supply voltage on the line 205 is connected through a resistor 269 to the collector of the transistor 268. The emitter of the transistor 268 is connected to the line 204 and terminal 265 and a capacitor 270 is connected between the collector and emitter electrodes of the transistor 268.

The supply voltage on the line 205 is also connected through the resistor 269 and through a resistor 271 to the emitter electrode of a transistor 272 which is of the PNP type. A voltage-dividing network including series connected resistors 273, 274, and 275 is connected between the supply voltage on the line 205 and the line 204. A slider arm 277 on the resistor 274 provides an adjustable bias supply to the base electrode of the transistor 272.

A diode 278 is connected between the collector electrodes of the transistors 268, 272, and a capacitor 279 is connected from the anode of the diode 278 to the line 204. An input is provided to the emitter of a unijunction transistor 280 from the collector of the transistor 272. With this circuit arrangement, the capacitor 279 is charged by current flowing through the resistors 269, 271 and the transistor 272. Adjustment of the slider arm 277 changes the conduction level of the transistor 272 to vary the charge time of the capacitor 279. When the capacitor 279 has charged to a sufficient voltage level, the unijunction transistor 280 will fire to produce a pulse of voltage at a base-1 electrode thereof. The base-2 electrode of the unijunction transistor 280 is connected through a resistor 281 to the cathode electrode of the zener diode 203. The base-1 electrode of the unijunction transistor 280 is connected through the primary windings 126 and 127 of the transformers $T_1$ and $T_2$ respectively. Therefore, when the unijunction transistor 280 fires to produce a pulse of voltage, these pulses of voltage will be realized in one of the primary windings 126, 127. As illustrated in the preceding figures, the primary windings 126, 127 may be connected to a motor-reversing circuit such as that including the previously described motor-reversing circuit 78 having a magnetic reed switch such as the reed switch 128 therein.

The capacitor 270 determines the time rate of charge of the capacitor 279 at each reversal of the motor 30, since any charge thereon will be shunted through the diode 278 until capacitor 270 is charged to a higher voltage level than that of capacitor 279. A positive delay pulse on a line 207 which is derived from the pulse delay circuit 80 is fed through a diode 208 to the base electrode of the transistor 268. This delay pulse causes the transistor 268 to be highly conductive discharging capacitor 270. The time delay caused by the charging of the capacitor 270 renders the firing angle control circuit inoperative until the capacitor 270 develops a higher charge than that on capacitor 279.

The base electrode of the transistor 268 is biased positive with respect to the emitter electrode thereof by means of series-connected resistors 282 and 283. However, a signal on the terminal 264 indicative of the motor 30 current, is negative with respect to the emitter of the transistor 268. Therefore, as the speed of the armature 97 decreases, the voltage developed between the base and emitter of the transistor 268 becomes less positive thereby decreasing the conduction level of the transistor 268. As the conduction level of the transistor 268 decreases, the capacitor 279 charges at a faster rate to provide an earlier firing time of the unijunction transistor 280.

Conversely, an increase of the speed of the armature 97 increases the conduction level of the transistor 268 which increases the time required for a charge to be developed on the capacitor 279 resulting in increased time intervals between firings of the unijunction transistor 280.

Control of the conduction of the firing pulses through the respective primaries 126, 127 of the transformers $T_1$, $T_2$ is obtained by the motor reversing circuit. A preferred embodiment of the motor reversing circuit 78 which may be employed with the circuit illustrated in FIGURE 14 is that illustrated in FIGURE 11. However, it will be appreciated that the delay pulse circuit illustrated in FIGURE 7 may also be employed in conjunction with the firing angle control circuit of FIGURE 14. With such arrangement, therefore, a delay pulse may be developed on the line 207 and through the diode 208 to the base of the transistor 268. This delay pulse causes the transistor 268 to be rendered highly conductive resulting in a complete discharge of the capacitors 270, 279. When the delay pulse has subsided, the transistor 268 will return to a conduction level dictated by the signal on the terminal 264 and the capacitors 270, 279 will begin to charge until the firing level of the transistor 280 is reached. Therefore, the interval between the firings of the unijunction transistor 280 during motor reversal will be dependent upon the time of the delay pulse and the time required to charge the capacitors 270, 279 from a substantially uncharged condition to the required level of voltage charge.

It should be noted at this point of the specification that the illustrative embodiments described to this point are capable of functioning in two different respects to control the arc length or agitation rate of agitator 29.

In the embodiments employing reed switch 128 to limit the arc length of agitator 29 to a predetermined limit, an increase in power to motor 30 increases the agitation rate or oscillation frequency of agitator 29 (or an alternating rotary drum if applied to a horizontal axis machine). For example, in FIGURE 5, moving the wiper arm on potentiometer 109 downwardly increases the power ultimately supplied to motor 30 and consequently increases the stroke rate or oscillation frequency of agitator 29. A similar effect would be achieved in the circuit of FIGURE 12 by moving the wiper arm 222 downwardly on potentiometer 220.

In contrast to the above-mentioned circuits employing reed switch 128 to fix the arcuate movement of agitator 29, the circuit shown in FIGURE 11 and cooperable with that shown in FIGURE 14 needs no electro-mechanical arc limiting devices. FIGURE 11 shows a flip-flop circuit 158 and a relaxation oscillator circuit 159 which independently control the agitation rate of agitator 29 regardless of the power supplied to motor 30 whereas FIGURE 14 shows a firing angle control circuit which controls the power supplied to motor 30 and thereby controls the arc length of agitator 29 for a preselected agitation rate as determined by circuit of FIGURE 11. Decreasing the resistance of potentiometer 181 in FIGURE 11 increases the agitation rate of agitator 29 and increasing the resistance of potentiometer 283 in the circuit of FIGURE 14 increases the power supplied to motor 30 and the arc length of agitator 29. Both the agitation rate and agitation arc length may therefore be controlled in this latter embodiment.

In both types of embodiments an increase of power as controlled by a firing angle control circuit increases the speed of the motor 30. In one case, however, an increase of motor speed results in an increase of agitation rate and in the other it results in an increase of agitation arc length.

Figure 15:
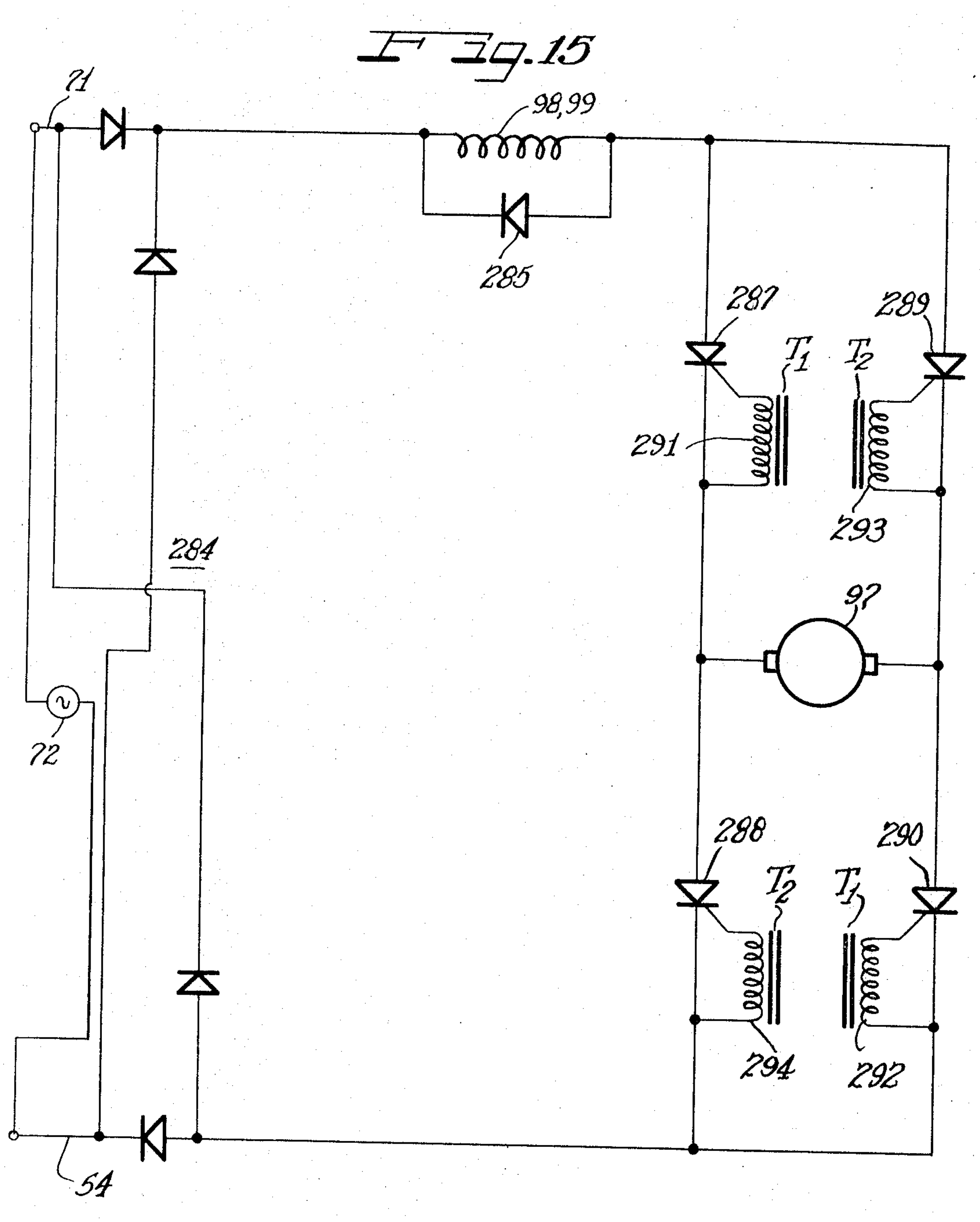
FIGURE 15 is a schematic diagram of the power control circuits employed in conjunction with a DC motor operable by electrically reversing its armature.

As illustrated in FIGURE 15, an alternate embodiment of the motor circuit includes a full wave bridge rectifier circuit 284 connected across the lines 54, 71 to which alternating current voltage from the power source 72 is supplied. The field windings 98, 99 of the motor 30 are connected in series with one another and to one output terminal of the rectifier circuit 284. In other words, an appropriate type DC motor having only one field winding may be used in the embodiment illustrated in FIGURE 15. A transient suppressing diode 285 is connected in parallel with the field windings 98, 99.

Connected between the field windings 98, 99, and the other output terminal of the rectifier circuit 284, is a pair of series connected silicon controlled rectifiers 287 and 288. Also connected between the field windings 98, 99 and the other input terminal of the bridge rectifier circuit 284 are a second pair of series connected silicon controlled rectifiers 289 and 290. In the present embodiment, the transformer $T_1$ includes a pair of secondary windings 291 and 292 and the transformer $T_2$ includes a pair of secondary windings 293 and 294. The secondary windings 291, 292, 293 and 294 are connected to the respective gate electrodes of the silicon controlled rectifiers 287, 290, 289, and 288 respectively. One terminal of the armature 97 is connected to a common point between the silicon controlled rectifiers 287, 288 and the other terminal thereof is connected to a common point between the silicon controlled rectifiers 289, 290.

It can be readily appreciated that as firing pulses are supplied to the transformer $T_1$, current will be applied through the field windings 98, 99, the silicon controlled rectifier 287, the armature 97, and the silicon controlled rectifier 290. However, when firing pulses are supplied to the transformer $T_2$, current will flow in the same direction through the field windings 98, 99, through the silicon controlled rectifier 289, the armature 97 in a reverse direction, and through the silicon controlled rectifier 288. Therefore, energization of the transformer $T_1$ causes current flow through the armature 97 in one direction while energization of the transformer $T_2$ causes current flow through the armature 97 in the opposite direction resulting in a reversal of the motor rotation. In the present embodiment, the field windings 98, 99 in series may be interchanged in the circuit with the armature 97. Such arrangement then allows reversal of current through the windings 98, 99 in series for accomplishing reversal of the motor directions.

Figure 16:
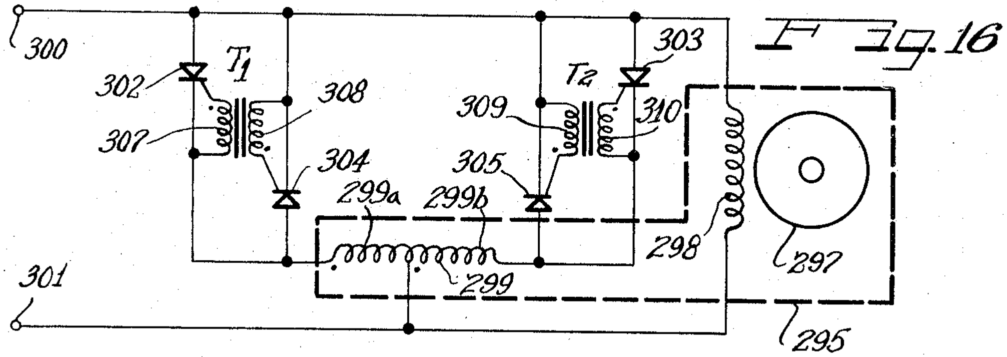
FIGURE 16 is a schematic diagram of the power control circuits employed in conjunction with a split phase AC motor.

An alternate arrangement of the motor and power control circuits is illustrated in FIGURE 16 wherein a split phase AC motor 295 is employed. The motor 295 includes an armature 297 and a pair of stator windings including a main winding 298 and an auxiliary winding 299. As shown, the auxiliary winding 299 is center tapped to provide a pair of separate windings **299*a* and 299*b*. AC voltage is applied to a pair of terminals 300 and 301 and across the main winding 298 of the motor. The terminal 300 is connected to the anodes of a pair of silicon controlled rectifiers 302 and 303 and to the cathodes of a second pair of silicon controlled rectifiers 304 and 305. The cathode of the rectifier 302 and the anode of the rectifier 304 are connected through the winding 299*a* to the terminal 301. Likewise, the cathode of the rectifier 303 and the anode of the rectifier 305 are connected through the winding 299*b* to the terminal 301**.

The transformer $T_1$ includes a pair of secondary windings 307 and 308 connected to the gate electrodes of the diodes 302, 304 respectively. Likewise, the transformer $T_2$ includes a pair of secondary windings 309 and 310 connected to the gate electrodes of the diodes 305, 303 respectively. The primary windings of the transformers $T_1$, $T_2$ are disposed in the previously described firing angle control circuits 77. Therefore, when a voltage pulse is developed in the primary windings of the transformers $T_1$, $T_2$ the respective silicon controlled rectifiers will conduct to allow current conduction through the auxiliary winding 299. However, since only one of the transformers $T_1$, $T_2$ may receive the firing pulse at a given time, conduction of current will flow in only one of the windings **299*a*, 299*b*** at that given time.

If the transformer $T_1$ is energized, the silicon controlled rectifiers 302, 304 will be gated on to allow positive pulses of the supply voltage through the SCR302 and negative pulses of the supply voltage through the SCR304 to energize the winding **299*a*. Similarly, when the transformer $T_2$ is energized, the SCR303, 305 will be gated on to allow conduction of current therethrough and through the winding 299*b*. The windings 299*a* and 299*b* are wound to provide motor rotation in respective opposite directions. Therefore, when current traverses the winding 299*a* and the main winding 298, the armature 297 will rotate in one direction while current flow through the winding 299*b* and the main winding 298** causes armature rotation in the opposite direction.

Figure 17:
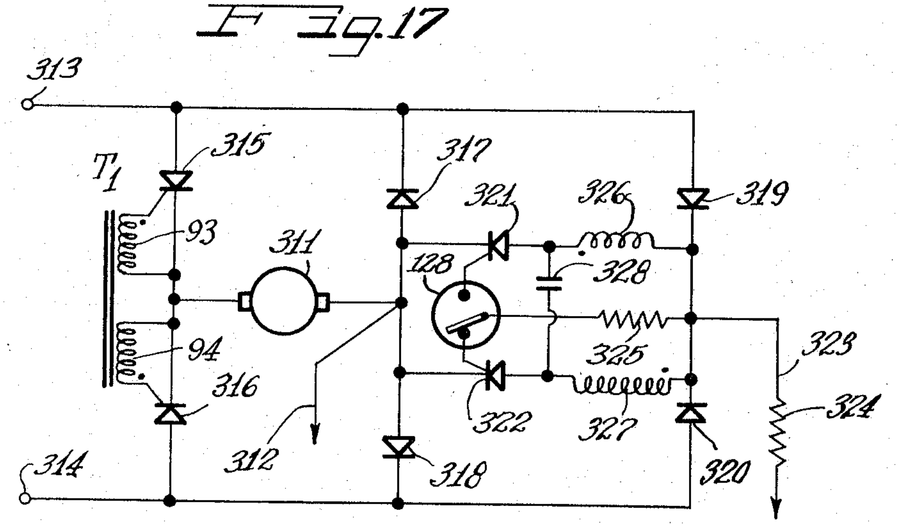
FIGURE 17 is a schematic diagram of a power control circuit employed in conjunction with a two-field shunt wound DC motor.

FIGURE 17 illustrates a shunt field DC motor circuit that can be employed to energize the motor 30 in either of two directions. The circuit of FIGURE 17, however, requires the use of only one triggering transformer $T_1$ rather than the two employed in the preceding figures. The primary winding of the transformer $T_1$ is connected between the base-1 of the unijunction transistor 111 and the line 92 of FIGURES 5 and 7. Similarly, the primary winding of the transformer $T_1$ may be connected between the unijunction transistor 179 and the line 92 in FIGURE 11; between the unijunction transistor 201 and the line 238 in FIGURE 12; and between the unijunction transistor 280 and the line 204 in FIGURE 14. In each of these modifications to FIGURES 5, 7, 11, 12, and 14, however, no other elements are connected to the base-1 of the respective unijunction transistor.

An AC supply voltage is connected to a pair of terminals 313 and 314 to supply voltage to the circuit. Connected in series with the supply voltage on the terminals 313, 314 are a pair of silicon controlled rectifiers 315 and

316 which are connected in opposing current flow direction to one another. The secondary windings 93, 94 of the transformer $T_1$ are connected to the gate electrodes of the silicon controlled rectifiers 315, 316 respectively. The shunt field DC motor includes an armature 311 and a pair of field windings 326, 327. One terminal of the armature 311 is connected to the common point between the respective cathode of the silicon controlled rectifiers 315, 316. The action of the silicon controlled rectifiers 315, 316 controls the armature 311 voltage which is proportional to the speed thereof. A feedback signal from the cathodes of the silicon controlled rectifiers 315, 316 may, if desired, be applied to the base of the transistor of the firing angle control circuit 77, such as the transistor 119 of FIGURE 7. This would provide a control of the armature 311 speed.

A pair of rectifiers 317 and 318 are also connected in shunt with the AC supply voltage on the lines 313, 314 with their respective anodes connected to one another. The other terminal of the armature 311 is connected to the respective anodes of the diodes 317, 318. Another pair of diodes 319 and 320 are also connected in shunt with the AC supply voltage on the terminals 313, 314 and have their respective cathodes connected to one another. The rectifiers 317, 318, 319, and 320 form a full wave bridge circuit to feed one or the other of the field windings 326, 327 which are connected at one end thereof to the cathodes of the rectifiers 319, 320. The other end of the field windings 326, 327 are connected through silicon controlled rectifiers 321 and 322 respectively, to the anodes of the rectifiers 317, 318.

The full wave bridge circuit including the rectifiers 317, 318, 319, and 320 also provide a supply voltage on the lines 312 and 323 for the remaining circuitry such as the firing angle control circuit 77. A current limiting resistor 324 may be employed in the line 323. The line 323 is also connected through a current limiting resistor 325 to the switching contact of the reed switch 128 which may be actuated by any of the above mentioned means, as described in connection with FIGURES 9 and 10. Respective contacts of the reed switch 128 are connected to the gate electrodes of the silicon controlled rectifiers 321, 322 respectively. A capacitor 328 is connected between the respective anodes of the silicon controlled rectifiers 321, 322 and performs a commutating function to force the conducting one of the silicon controlled rectifiers 321, 322 to turn off when the other silicon controlled rectifier turns on at reversal of the armature 311.

The reed switch 128 in the position shown in FIGURE 17 applies a gating voltage to the silicon controlled rectifier 322 to provide a flow of current through the field winding 327 to drive the armature 311 in one direction. However, when the reed switch 128 is in the opposite position from that shown in FIGURE 17, a gating pulse is supplied to the silicon controlled rectifier 321 to allow current flow through the field winding 326 to drive the armature 311 in the opposite direction.

The amount of current flow through the armature 311 is determined by the conduction time of the silicon controlled rectifiers 315, 316. Therefore, current will flow through the armature 311 only after a gating pulse is developed in the transformer $T_1$ to turn on the silicon controlled rectifiers 315, 316. Consequently, the motor will not be energized regardless of current flow through the field windings 326, 327 until current flow is initiated through the armature 311. However, the direction of rotation of the armature 311 is determined by which of the silicon controlled rectifiers 321, 322 is conducting to allow current flow through the respective field windings 326, 327. Therefore, actuation of the reed switch 128 causes a reversal of the rotational movement of the armature 311 and, by proper location of a timer switch in the circuit, one of the field windings 326, 327 can be continuously energized for spin operation.

Figure 18:
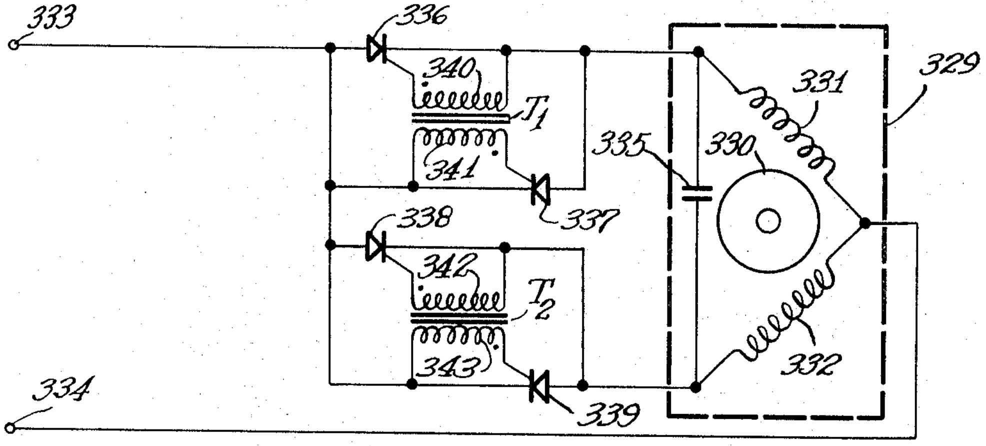
FIGURE 18 is a schematic diagram of the power control circuits employed in conjunction with a three lead reversible AC motor.

Still another form of the motor and power control circuits is illustrated in FIGURE 18 wherein a three-lead reversible AC motor 329 is employed as the drive motor for the laundry machine. The motor 329 includes an armature 330 and a pair of windings 331 and 332. An AC supply voltage is connected between a pair of terminals 333 and 334. One end of the winding 331 and one end of the winding 332 are connected to the terminal 334 and the other ends of the windings 331, 332 are connected together through a capacitor 335. A pair of silicon controlled rectifiers 336 and 337 are connected in parallel with one another and in opposite relationship between the terminal 333 and the winding 331. Similarly, a second pair of silicon controlled rectifiers 338 and 339 are connected in parallel with one another and in opposite relationship between the terminal 333 and the winding 332. The motor acts as a capacity run induction motor by virtue of the capacitor 335.

The transformer $T_1$ includes a pair of secondary windings 340 and 341 each connected to the respective gate electrodes of the rectifiers 336, 337 respectively. Likewise, the transformer $T_2$ includes a pair of secondary windings 342 and 343 each connected to the respective gate electrodes of the rectifiers 338, 339.

When the transformer $T_1$ is energized the rectifiers 336, 337 conduct on alternate half cycles of the AC voltage source to allow current flow through the winding 331 to drive the armature 330 in one prescribed direction. However, when the transformer $T_2$ is energized, the rectifiers 338, 339 conduct on alternate half cycles of the AC voltage source to allow current flow through the winding 332 to drive the armature 330 in the opposite direction. Again, for purposes of clarity, the primary windings of the transformers $T_1$, $T_2$ have not been illustrated in the present embodiment and it is to be understood that they are included in the preceding figures and energized in the above prescribed manner set forth in the description of those figures.

Figure 19:
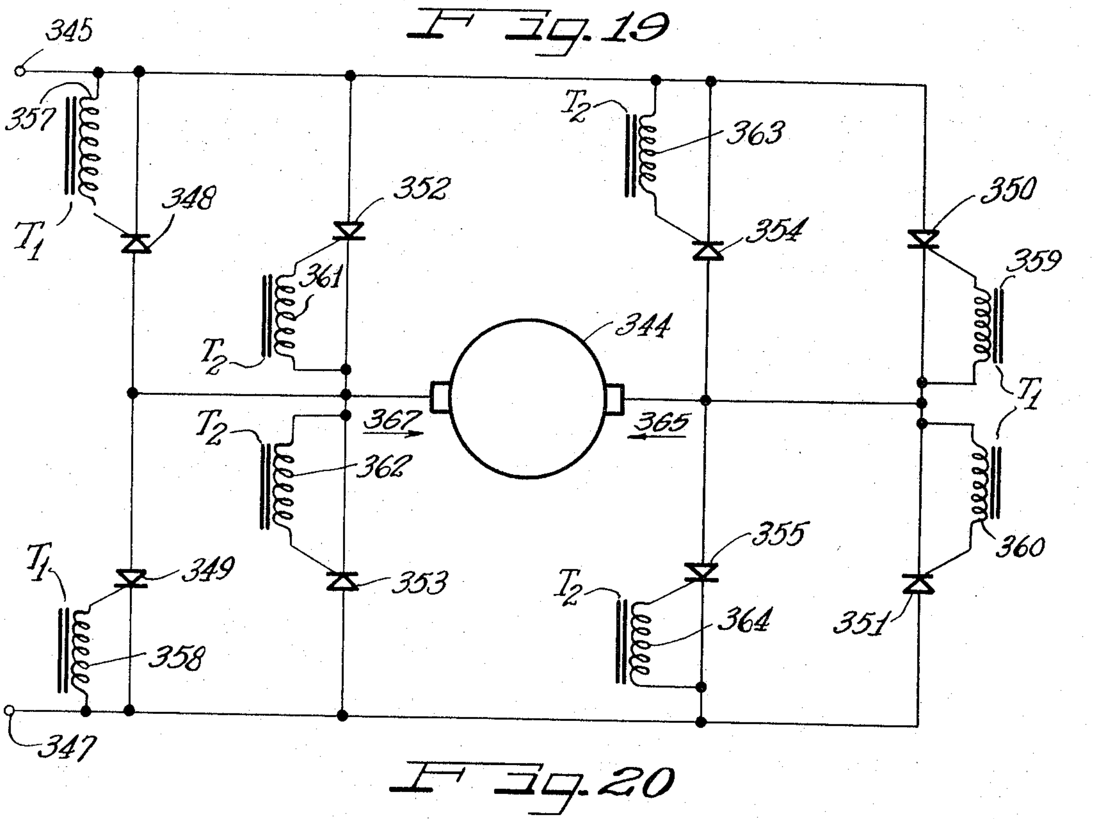
FIGURE 19 is a schematic diagram of the power control circuits employed in conjunction with a permanent magnet field motor.

The embodiment illustrated in FIGURE 19 employs a permanent magnet field motor having an armature 344. The AC supply voltage is connected between terminals 345 and 347. A pair of silicon controlled rectifiers 348 and 349 have their anodes connected to one another and are series connected between the terminals 345, 347. A second pair of silicon controlled rectifiers 350 and 351 have their cathodes connected to one another and are series connected between the terminals 345, 347. A third pair of silicon controlled rectifiers 352 and 353 have their cathodes connected to one another and are series connected between the terminals 345 and 347. Likewise, a fourth pair of silicon controlled rectifiers 354 and 355 have their anodes connected to one another and are series connected between the terminals 345, 347.

The transformer $T_1$ includes a plurality of secondary windings 357, 358, 359, and 360 each connected to a respective gate electrode of the silicon controlled rectifiers 348, 349, 350, and 351 respectively. Similarly, the transformer $T_2$ includes a plurality of secondary windings 361, 362, 363, and 364 each connected to a respective gate electrode of the silicon controlled rectifiers 352, 353, 354, 355 respectively.

The cathodes of the rectifiers 350, 351 and the anodes of the rectifiers 354, 355 are connected to one terminal of the armature 344. Similarly, the anodes of the rectifiers 348, 349 and the cathodes of the rectifiers 352, 353 are connected to the other terminal of the armature 344. Therefore, when a voltage pulse is developed in the secondary windings 357, 358, 359, and 360 of the transformer $T_1$, current flow will result through the armature in a direction indicated by an arrow 365. However, when the secondary windings 361, 362, 363, and 364 of the transformer $T_2$ are energized to gate the respective silicon controlled rectifiers on, current will flow through the armature 344 in an opposite direction as indicated by an arrow 367. The transformers $T_1$, $T_2$ have their primary windings connected in the firing angle control circuit 77 as described above.

Figure 20:
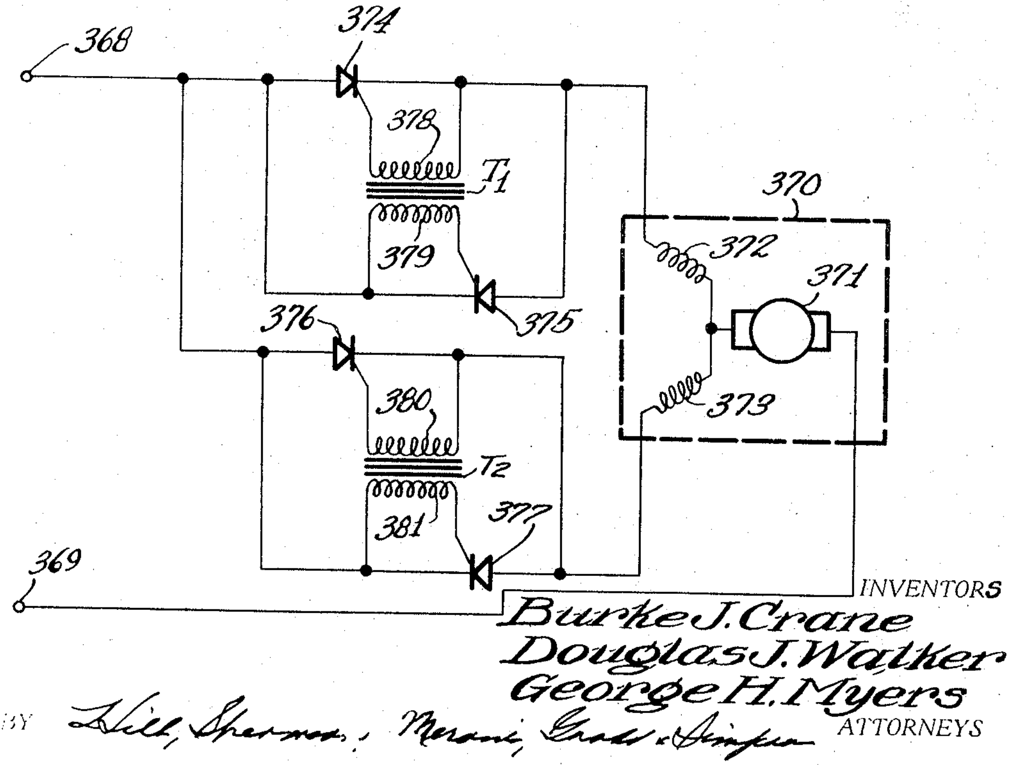
FIGURE 20 is a schematic diagram of the power control circuits employed with an AC universal motor.

The motor and control circuit illustrated in FIGURE 20 includes an AC universal motor for driving the laundry machine. The AC supply voltage is connected across a pair of terminals 368 and 369 to supply voltage to the circuit. An AC universal motor 370 includes an armature 371 and a pair of field windings 372 and 373. One side of the armature 371 is connected to the terminal 369.

A pair of silicon controlled rectifiers 374 and 375 are connected in parallel to one another in an opposite current-conducting relationship. Similarly, a pair of silicon controlled rectifiers 376 and 377 are also connected in parallel with one another in opposite current-conducting relationship. The transformer $T_1$ includes a pair of secondary windings 378 and 379 connected to the respective gate electrodes of the silicon controlled rectifiers 374, 375. Similarly, the transformer $T_2$ includes a pair of secondary windings 380 and 381 connected to the respective gate electrodes of the silicon controlled rectifiers 376, 377. The armature 371 is connected through the field winding 372 and the parallel connected silicon controlled rectifiers 374, 375 to the terminal 368. The armature 371 is also connected through the field winding 373 and the parallel connected silicon controlled rectifiers 376, 377 to the terminal 368. The primary windings of the respective transformers $T_1$, $T_2$ are not shown in FIGURE 20 for purposes of clarity, but it is to be understood that they are pulsed in a like manner as described with respect to the preceding figures.

When a gating pulse is supplied to the transformer $T_1$, the silicon controlled rectifiers 374, 375 are gated on to allow current flow through the field winding 372 and the armature 371 to drive the armature 371 in one direction. However, when the transformer $T_2$ is pulsed, the silicon controlled rectifiers 376, 377 are gated on to allow current flow through the field winding 373 and the armature 371 to provide rotation of the armature 371 in an opposite direction. It can be readily appreciated that the field windings 372, 373, when energized with current, provide respective opposite rotational movement to the armature 371.

Figure 21:
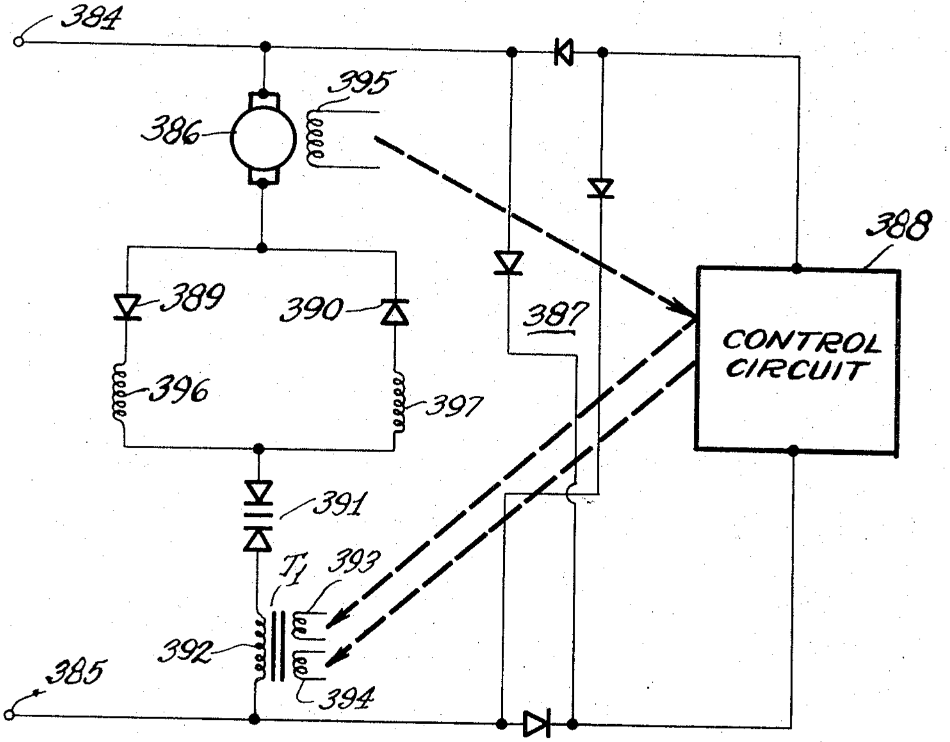
FIGURE 21 is a schematic diagram of an alternate embodiment of the power control circuit employed in conjunction with a drive motor.

Still another embodiment of the motor and power control circuits is illustrated in FIGURE 21 wherein the AC supply voltage is connected across a pair of terminals 384 and 385. A full wave bridge rectifier circuit 387 is connected across the terminals 384, 385 and includes a pair of output terminals connected to a control circuit 388. The control circuit 388 being illustrated as a single block in FIGURE 21 is representative generally of the firing angle control circuit 77 of the preceding figures. The motor includes an armature 386 and a pair of field windings 396 and 397.

One terminal of the armature 386 is connected to the terminal 384 and the other terminal thereof is connected to a parallel circuit having in one branch thereof a diode 389 and the field winding 396 connected in series and in the other branch thereof a diode 390 and the field winding 397 also connected in series. The diodes 389, 390 are connected in opposite relationship between the respective field windings 396, 397 and the armature 386. The other side of the parallel circuit is connected through a multi-layer switching device 391 and a secondary winding 392 of the transformer $T_1$ to the terminal 385. The transformer $T_1$ includes a pair of primary windings 393 and 394 selectively energizable from the control circuit 388. A tachometer indicated diagrammatically by a pick-up coil 395 is disposed adjacent the armature 386 for sensing a speed thereof and for producing a signal indicative of such speed for supplying an input to the control circuit 388.

The multi-layer switching device 391 performs to allow current flow in either direction therethrough when a pulse of voltage is developed across its terminals of a sufficient value. When the switching device 391 has begun conduction, however, a voltage of a lesser value than that required to trigger it, will maintain conduction therethrough. Therefore, if a pulse of voltage is developed in the secondary winding 392 of the transformer $T_1$ sufficient to cause conduction through the switching device 391 in either direction, any voltage on the terminals 384, 385 will maintain that conduction until the supply voltage cycle passes through a zero point. Therefore, when a voltage pulse is induced in the secondary winding 392 during the half cycle of the supply voltage that adds to the supply voltage, the switching device 391 will conduct to cause current flow through one of the field windings 396, 397 and through the armature 386. When, however, a pulse of voltage of opposite polarity is induced in the secondary winding 392, the switching device 391 will conduct in the opposite direction to supply current flow through the other of the field windings 396, 397 and through the armature 386. It will then be appreciated that pulsing of the primary winding 393 will allow current flow through the armature 386 and one of the field windings 396, 397 only during cycles of the supply voltages of one polarity while pulsing of the primary winding 394 will allow current conduction during pulses of the supply voltage of the opposite polarity. Consequently, current flow through the field winding 396 will cause motor rotation in one direction while current flow through the field winding 397 will cause motor rotation in the opposite direction.

It will now be appreciated that we have shown and described a novel control circuit for a washing machine driven by a reversible motor controlled by a power circuit which when properly triggered by a motor reversing circuit or bistable means automatically effects a cyclic and periodic reversal of the motor for similarly reversing an agitator of a vertical axis washing machine or a rockable drum of horizontal axis washing machine. Various forms of firing angle circuits have been disclosed and described for regulating the power supplied to different types of reversible motors illustrated in the description of our invention. Voltage and current sensitive circuits and other forms of motor control circuits have also been incorporated in our invention together with controls for regulating the arc length and agitation rate of the washing machine agitator. Pulse delay circuits for easing the inertial loading of the agitator between strokes have also been incorporated in our control which represents an unusual advance in the washing machine art.

It will be appreciated that a number of different and various embodiments may be constructed from the above-described circuits, however, only those presently preferred have been described herein. It is, therefore, to be understood that the circuits described herein may be combined in any desirable configuration to provide the desired motor control. It is accordingly desired that, in construing the breadth of the appended claims, they shall not be limited to the specific details shown and described in connection with the exemplifications thereof.

Although various minor structural modifications might be suggested by those versed in the art, it should be understood that we wish to embody within the scope of the patent hereon all such modifications as reasonably and properly come within the scope of our contribution to the art.

The embodiments of the invention in which an exclusive property or privilege is claimed are defined as follows:

1. In a washing machine including a rotatable clothes-receiving member for effecting a centrifuging operation on fabrics inserted therein and cyclically reversible agitation means for effecting a washing operation on said fabrics during an agitation operation,
   - a sequential controller for operating said washing machine through said agitation and centrifuging operations,
   - a reversible motor having first and second field windings and a rotor mechanically connected to said agitation means and said clothes-receiving member,
   - power control circuit means electrically connected to said reversible motor and including means for selectively energizing said first winding to effect rotation of said rotor in a first direction and for energizing said second winding to effect rotation of said rotor in a second direction,
   - motor reversing circuit means electrically connected to said power control circuit means for cyclically providing an electrical control signal to said power control circuit means to effect an automatic cyclic reversal of said agitation means by cyclic reversal of said rotor during said agitation operation,
   - and means controlled by said sequential controller for terminating the energization of said first field winding to effect only a unidirectional rotation of said rotor during said centrifuging operation,
   - and means electrically connected to said reversible motor and controlled by said sequential controller for increasing the rotational speed of said rotor during said centrifuging operation.

2. A control circuit for a laundry machine having an oscillatable washing means, comprising,
   - a reversible electric motor,
   - a first circuit forming a power circuit for applying power to said motor for rotation of said motor in elected direction,
   - a second circuit forming a motor reversing circuit having reversing switching means for cyclically reversing said motor,
     - means coupling said first and second circuits electrically,
   - a firing angle control circuit generating pulses to regulate the output voltage of said first circuit which is applied to said motor at a constant level via said first and second circuits, and
   - presettable sequential control means including timer controlled switching means for regulating said pulses to said motor reversing circuit and for conditioning said reversing switching means for permitting unidirectional rotation as a function of a preselected operational program for said laundry machine.

3. A control circuit as defined in claim 2 and an output voltage sensing means supplying said firing angle control circuit with a control signal which is a function of voltage applied to said motor from said first circuit.

4. A control circuit as defined in claim 2 and a current sensing means supplying said firing angle control circuit with a control signal which is a function of the current applied to said motor.

5. A control circuit as defined in claim 2 and a line voltage sensing means to regulate the voltage supplied to said firing angle control circuit as a function of line voltage, thereby to maintain motor voltage constant.

6. A laundry machine comprising,
   - means forming a treatment zone including actuatable means for agitating materials to be laundered in the presence of a supply of laundry liquid and for spinning the materials centrifugally,
   - presettable sequential control means for automatically operating the machine through a program including a series of washing, rinsing and drying stpes,
   - and circuit means regulated by said control means including
     - a reversible split series motor to drive said actuatable means,
     - a power supply circuit for energizing said motor, with an output voltage,
     - a motor reversing circuit connected electrically with said power supply circuit and having reversing switch means for selectively reversing the direction of operation of said motor to reverse said actuatable means cyclically,
     - a firing angle control circuit for generating pulses to regulate said output voltage at a constant level via said supply circuit and said reversing circuit,
   - and switching means for regulating said pulses to said reversing circuit and for selectively conditioning said reversing switch means during a spinning period.

7. A laundry machine as defined in claim 6 wherein said actuatable means comprises a rotatable laundry receptacle and an agitator in said receptacle.

8. A laundry machine as defined in claim 6 and further characterized by said motor reversing circuit including an RC circuit means for operating said reversing switches as a function of time.

9. A laundry machine as defined in claim 6 and further characterized by said motor reversing circuit including limit switches for controlling said reversing switches as a function of agitator position.

10. In a clothes washing machine which includes a clothes basket mounted for rotation and an agitator mounted for oscillation within said basket, a motor drive for said basket and agitator including
a reversible motor having a rotatable shaft,
said agitator having a connection with said motor shaft, means for selectively connecting said basket through said connection to said motor shaft,
a first motor energization circuit for causing rotation of said motor shaft in one direction,
and a second motor energization circuit for causing rotation of said motor shaft in the opposite direction,
a motor control circuit comprising:
an AC supply line,
means for connecting said supply line selectively and periodically to first one of said motor energization circuits for causing rotation of said motor shaft in the one direction and then to the other of said motor energization circuits for causing rotation of said motor shaft in the opposite direction,
means for limiting conduction time to a portion of each half cycle of current fed from said AC supply line to said energization circuits,
and means for automatically varying said portion of each half cycle to maintain substantially constant motor speed under varying load conditions.

11. In a washing machine of the type set forth in claim 10 in which means is provided in the control circuit thereof for delaying, for a predetermined time, connection of said supply line to each of said energization circuits after disconnection thereof from the other of said energization circuits.

12. In a clothes washing machine which includes a clothes basket mounted for rotation and an agitator mounted for oscillation within said basket, a motor drive for said basket and agitator including
a reversible motor having a rotatable shaft,
said agitator having a drive connection with said motor shaft,
means for selectively connecting said basket through said drive connection to said motor shaft,
a first motor energization circuit for causing rotation of said motor shaft in one direction,
and a second motor energization circuit for causing rotation of said motor shaft in the opposite direction,
a motor control circuit comprising,
an AC supply line,
bistable means having the two opposite output states each for connecting said supply line to respective ones of said motor energization circuits,
and means for periodically triggering said bistable means and reversing the output state.

13. In a washing machine of the type set forth in claim 12 in which the triggering means of the control circuit includes an RC time constant circuit having a predetermined charge time to provide the periodic triggering of said bistable means.

14. In a washing machine of the type set forth in claim 12 in which the periodical triggering means includes means for rendering said bistable means operative in one of the output states.

15. In a clothes washing machine including a clothes basket mounted for rotation and an agitator mounted for oscillation within said basket, a motor drive for said basket and agitator including
a reversible motor having
a rotatable drive shaft,
and a control circuit for said motor comprising,
a pair of energization circuits connected to said motor for causing rotation of said drive shaft respectively in opposite directions,
bistable means having two opposite output states each connected to a respective one of said energization circuits,
and means for periodically triggering said bistable means and reversing the output states.

16. In a clothes washing machine including a clothes basket mounted for rotation and an agitator mounted for oscillation within said basket, a motor drive for said basket and agitator including a reversible motor having a rotating drive shaft,
and a control circuit for said motor comprising,
bistable means for providing two opposite output states including an "on" state and an "off" state,
means for periodically triggering said bistable means and reversing the output state, and
a pair of energization circuits each connected to said bistable means and each responsive to an "on" output for causing rotation of said drive shaft in a respective opposite direction.

17. In a laundry machine having a tub for receiving cleaning and rinsing solution therein, a spin basket mounted within said tub for selective rotational movement,
an agitator rotatably mounted within said spin basket,
and a control system for said agitator and spin basket,
said control system comprising,
a source of alternating-current voltage,
a pair of power control circuits connected to said source of voltage,
a motor connected to an output of each of said power control circuits and each providing energization of said motor in respective opposite directions,
means for sensing a speed of said motor,
a firing angle control circuit connected to an output of said sensing means and including a pair of outputs, and
means for connecting one of said outputs of said firing angle control circuit to one of said power control circuits,
said power control circuits being responsive to an output of said firing control circuit to provide energization of said motor.

18. In a laundry machine including an agitator mounted for rotational movement and a motor drivingly connected to said agitator, a control system for said motor comprising,
a pair of power control circuits each connected to said motor to provide energization thereof in respective opposite directions upon the occurrence of a trigger input thereto,
means for sensing a speed of said motor,
a firing angle control circuit connected to an output of said speed sensing means and including a pair of triggering outputs, and
means for selectively coupling each of said triggering outputs to a respective one of said power control circuits to provide a trigger input thereto.

19. In a laundry machine including an agitator and a motor for driving said agitator, a control system for said motor comprising, a source of AC voltage, a pair of controlled conduction means connected between said source of voltage and said motor, each providing energization of said motor in respective opposite directions upon the occurrence of a gate pulse at an input thereto, means for sensing a speed of said motor, and a firing angle control circuit connected to an output of said speed sensing means and including a pair of output signals, each of said output signals including a plurality of gate pulses synchronized with said source of AC voltage and each having a time span in accordance with the output of said speed sensing means.

20. In a laundry machine inculding a tub, a motor having an output shaft, an agitator mounted on said output shaft, a spin basket disposed within said tub, means for fixedly mounting said spin basket within said tub during an agitation portion of a laundry cycle and for rotatably mounting said spin basket within said tub in engagement with said output shaft during a spin portion of the laundry cycle, the improvement of a motor control system comprising, a pair of power control circuits each responsive to a gate signal for energizing said motor in respective opposite directions of rotational movement, means for sensing a speed of said motor which includes a first output, a firing angle control circuit connected to said first output of said speed sensing means and including second and third outputs, each of said second and third outputs including at least one gate signal having a time span in accordance with said first output of said speed sensing means, means for selectively coupling said gate signal to a respective one of said power control circuits, means for periodically switching said gate signal from one power control circuit to the other during the agitation portion, and means for disabling said switching means during the spin portion.

21. The laundry machine as defined in claim 20 wherein said firing angle control circuit includes, a first transistor having a conduction level dependent upon the output of said speed sensing means, a first capacitor connected to said first transistor and having a level of charge thereon dependent upon the conduction level of said first transistor, a second transistor having a base thereof coupled to said first transistor and having a conduction level dependent upon the conduction level of said first transistor, a second capacitor connected to said second transistor and having a level of charge developed theron dependent upon the conduction level of said second transistor, a diode having an anode thereof connected to said second capacitor and a cathode thereof connected to said first capacitor, and a unijunction transistor having an emitter thereof connected to said second capacitor and a base thereof connected to said coupling means.

22. The laundry machine as defined in claim 20 wherein said firing angle control circuit includes, a first transistor connected to said speed sensing means and having a conduction level between a collector and emitter thereof dependent upon an output of said speed sensing means, a capacitor, a pair of resistors, one having a lesser resistance value than that of the other, said one resistor connected to the collector of said first transistor and said other resistor connected to said capacitor, a diode having an anode connected to the collector of said first transistor and a cathode connected to the connection between said second resistor and said capacitor, and a unijunction transistor having an emitter connected to the cathode of said diode and a base thereof connected to said coupling means.

23. The laundry machine as defined in claim 22 including delay means coupled to said capacitor and to the base of said unijunction transistor for removing any charge developed on said capacitor during the switching of said gate signal from one power control circuit to the other.

24. In a washing machine for cleaning fabrics, a container for receiving said fabrics, agitator means within said container for agitating said fabrics, a reversible motor drivingly connected to said agitation means, power circuit means including switching means connected to said reversible motor and directly controlling the energization and cyclic reversal of said reversible motor, and bistable means controlling said power circuit means to automatically and cyclically effect the periodic and cyclic reversal of said reversible motor and said agitation means.

25. The invention set forth in claim 24 further including adjustable means cooperable with said bistable means and providing a means for selectively varying the stroke length of said agitation means.

26. The invention set forth in claim 24 further including adjustable means cooperable with said bistable means and providing a means for selectively varying the stroke rate of said agitation means.

27. The invention set forth in claim 24 further including a pulse delay circuit for automatically deferring the application of power to said reversible motor between agitation strokes of said agitation means.

28. The invention set forth in claim 24 further including circuit means responsible to the voltage applied to said reversible motor and cooperable with said bistable means in controlling said reversible motor at a constant speed.

29. The invention set forth in claim 24 further including circuit means sensitive to current flow through said reversible motor and responsive to said current flow to prevent excessive current flow through said reversible motor.

30. The invention set forth in claim 24 further including line voltage sensing means responsive to changes in line voltage supplied to said motor and automatically responsive to changes in such line voltage for altering the voltage supplied to said reversible motor.

31. The invention set forth in claim 24 in which said reversible motor is a split series DC motor.

32. The invention set forth in claim 24 further including a firing angle circuit for controlling the time within each cycle of line source voltage when power will be supplied to said reversible motor.

33. The invention set forth in claim 32 in which said power circuit means includes a solid state switching device gated by signals from said firing angle circuit.

34. In a washing machine including a clothes receiving member and cyclically reversible agitation means for effecting a washing operation on said fabrics including:

a sequential controller for operating said washing machine through an agitation cycle;

a reversible motor having first and second field windings and a rotor mechanically connected to said agitation means;

power control circuit means electrically connected to said reversible motor and including means for selectively energizing said first winding to effect rotation of said rotor in a first direction and to energize said second winding to effect rotation of said rotor in a second direction; and motor reversing circuit means electrically connected to said power control circuit means for cyclically providing an electrical control signal to said power control circuit means to effect an automatic cyclic reversal of said agitation means by cyclic reversal of said motor during said agitation cycle.

35. A laundry machine as defined in claim 6, wherein the agitation means comprises means for cyclically reversibly rotating said means forming said treatment zone.

References Cited

UNITED STATES PATENTS

| | | | |
|---|---|---|---|
| 2,225,407 | 12/1940 | Bassett | 68—24 X |
| 2,935,674 | 5/1960 | Hohne | 318—293 |
| 3,095,534 | 6/1963 | Cockrell | 321—19 |
| 3,152,462 | 10/1964 | Elliott et al. | 68—12 |
| 3,152,463 | 10/1964 | Sones et al. | 68—12 |
| 3,184,933 | 5/1965 | Gaugler | 68—12 X |
| 3,194,032 | 7/1965 | Von Brimer | 68—12 X |
| 3,216,227 | 11/1965 | Alger et al. | 68—12 X |
| 3,248,908 | 5/1966 | Pope | 68—24 X |
| 3,264,544 | 8/1966 | Bowers | 68—12 X |

WILLIAM I. PRICE, *Primary Examiner.*